(12) United States Patent
Ke

(10) Patent No.: US 11,924,749 B2
(45) Date of Patent: Mar. 5, 2024

(54) METHOD FOR CONTROLLING LAN SERVICE AND COMMUNICATIONS DEVICE

(71) Applicant: VIVO MOBILE COMMUNICATION CO., LTD., Guangdong (CN)

(72) Inventor: Xiaowan Ke, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 506 days.

(21) Appl. No.: 17/168,073

(22) Filed: Feb. 4, 2021

(65) Prior Publication Data

US 2021/0160771 A1    May 27, 2021

Related U.S. Application Data

(63) Continuation of application No. PCT/CN2019/098555, filed on Jul. 31, 2019.

(30) Foreign Application Priority Data

Aug. 10, 2018  (CN) .......................... 201810912302.4

(51) Int. Cl.
*H04W 48/18* (2009.01)
*H04L 67/51* (2022.01)
*H04L 67/60* (2022.01)
*H04W 84/12* (2009.01)

(52) U.S. Cl.
CPC ............. *H04W 48/18* (2013.01); *H04L 67/51* (2022.05); *H04L 67/60* (2022.05); *H04W 84/12* (2013.01)

(58) Field of Classification Search
CPC ...... H04W 48/18; H04W 84/12; H04L 67/51; H04L 67/60; H04L 41/0894; H04L 67/12; H04L 67/52; H04L 41/26; H04L 41/5041; H04L 65/40
See application file for complete search history.

(56) References Cited

U.S. PATENT DOCUMENTS

| 8,958,404 B2 | 2/2015 | Malkamaki et al. |
| 2005/0170852 A1 | 8/2005 | Li et al. |
| 2007/0211629 A1 | 9/2007 | Mori |

(Continued)

FOREIGN PATENT DOCUMENTS

| CN | 102484844 A | 5/2012 |
| CN | 103327567 A | 9/2013 |

(Continued)

OTHER PUBLICATIONS

"3rd Generation Partnership Project; Technical Specification Group Services and System Aspects; Policy and Charging Control Framework for the 5G System; Stage 2 (Release 15)," 3GPP TS 23.503 V15.1.0, pp. 1-65, (Mar. 2018).

(Continued)

*Primary Examiner* — Hashim S Bhatti
(74) *Attorney, Agent, or Firm* — Maschoff Brennan

(57) ABSTRACT

Embodiments of this disclosure provide a method for controlling a LAN service and a communications service. The method for controlling a LAN service includes: transmitting LAN-service-related information, where the LAN-service-related information includes at least one of the following: LAN service capability information of a terminal, location information of the terminal, LAN service subscription information, and LAN service request information.

15 Claims, 12 Drawing Sheets

(56) References Cited

U.S. PATENT DOCUMENTS

| | | |
|---|---|---|
| 2008/0117884 A1 | 5/2008 | Ishii et al. |
| 2009/0158442 A1 | 6/2009 | Zhang |
| 2012/0184282 A1 | 7/2012 | Malkamaki et al. |
| 2018/0184367 A1 | 6/2018 | Yeon et al. |

FOREIGN PATENT DOCUMENTS

| | | |
|---|---|---|
| JP | 2016-010072 A | 1/2016 |
| JP | 2020-005010 A | 1/2020 |
| KR | 20060086514 A | 8/2006 |
| KR | 10-2018-0021636 A | 3/2018 |
| WO | 2017180260 A1 | 10/2017 |
| WO | 2018038490 A1 | 3/2018 |

OTHER PUBLICATIONS

KR Office Action dated Oct. 18, 2022 as received in Application No. 10-2021-7007308.

SG Office Action dated Nov. 2, 2022 as received in Application No. 11202101097W.

Japanese Office Action dated Apr. 25, 2022 as received in application No. 2021-506674.

"UE policies granularity and UE assistance for policy evaluation" 3GPP TSG-SA WG2 Meeting #126 S2-181612 Montreal, Canada Feb. 26-Mar. 2, 2018, Ericsson, NEC, Lenovo.

Korean Office Action dated Apr. 5, 2022 as received in application No. 10-2021-7007308.

Indian Office Action dated Jan. 25, 2022 as received in application No. 202127009096.

"Study on 5GS Enhances support of Vertical and LAN Services" 3GPP TR 23.734. Technical Specification Group Services and System Aspects, Jul. 2018.

"Service requirements for the 5G system" 3GPP TS 22.261. Technical Specification Group Services and System Aspects, Jun. 2018.

Written Opinion and International Search Report dated Feb. 25, 2021 as received in application No. PCT/CN2019/098555.

"Feasibility Study on LAN Support in 5G" 3GPP TR 22.821 V2.0.0, Mar. 2018.

METHOD FOR CONTROLLING LAN SERVICE AND COMMUNICATIONS DEVICE

CROSS-REFERENCE TO RELATED APPLICATIONS

This application is a continuation application of International Application No. PCT/CN2019/098555 filed on Jul. 31, 2019, which claims priority to Chinese Patent Application No. 201810912302.4 filed in China on Aug. 10, 2018, which is incorporated herein by reference in its entirety.

TECHNICAL FIELD

Embodiments of this disclosure relate to the field of wireless communications technologies, and in particular to a method for controlling a LAN service and a communications service.

BACKGROUND

Many vertical industries, such as railway dispatching and automated control, impose communication requirements. 5G communications networks can provide local area network (LAN)-type private communications services for the vertical industries, to meet communication needs of the vertical industries.

However, how to support the LAN services has not yet been determined.

SUMMARY this disclosure is implemented as follows:

According to a first aspect, an embodiment of this disclosure provides a method for controlling a LAN service, applied to a first communications device. The control method includes: transmitting LAN-service-related information, where the LAN-service-related information includes at least one of the following: LAN service capability information of a terminal, location information of the terminal, LAN service subscription information, and LAN service request information.

According to a second aspect, an embodiment of this disclosure provides a method for controlling a LAN service, applied to a second communications device. The control method includes: transmitting LAN service capability information of a network.

According to a third aspect, an embodiment of this disclosure provides a method for controlling a LAN service, applied to a third communications device. The control method includes: obtaining LAN-service-related information related to a terminal, where the LAN-service-related information includes at least one of the following: a LAN service capability of the terminal, location information of the terminal, LAN service subscription information, and LAN service request information; and performing a first related operation of a LAN service based on the LAN-service-related information.

According to a fourth aspect, an embodiment of this disclosure provides a method for controlling a LAN service, applied to a terminal. The control method includes: obtaining first information, where the first information includes at least one of the following: LAN-service-related configuration information, LAN-service-relay-related configuration information, and LAN-related route selection policy information; and performing a second related operation of a LAN service based on the first information.

According to a fifth aspect, an embodiment of this disclosure provides a method for controlling a LAN service, applied to a terminal. The control method includes: transmitting first request information, where the first request information includes at least one of the following: request information for joining a target LAN and request information for serving as a relay for the target LAN.

According to a sixth aspect, an embodiment of this disclosure provides a method for controlling a LAN service, applied to a network-side device. The control method includes: determining whether a preset condition is satisfied; and if the preset condition is satisfied, performing a third related operation of a LAN service.

According to a seventh aspect, an embodiment of this disclosure provides a method for controlling a LAN service, applied to a terminal. The control method includes: obtaining second information, where the second information includes at least one of the following: LAN-relay-related information of a target LAN, LAN-related information of the target LAN, information about whether joining the target LAN is allowed, and information about whether serving as a relay for the target LAN is allowed; and performing a fourth related operation of the LAN service based on the second information.

According to an eighth aspect, an embodiment of this disclosure provides a first communications device, including a transmitting module, configured to transmit LAN-service-related information, where the LAN-service-related information includes at least one of the following: LAN service capability information of a terminal, location information of the terminal, LAN service subscription information, and LAN service request information.

According to a ninth aspect, an embodiment of this disclosure provides a second communications device, including a transmitting module, configured to transmit LAN service capability information of a network.

According to a tenth aspect, an embodiment of this disclosure provides a third communications device, including: an obtaining module, configured to obtain LAN-service-related information related to a terminal, where the LAN-service-related information includes at least one of the following: a LAN service capability of the terminal, location information of the terminal, LAN service subscription information, and LAN service request information; and an execution module, configured to perform a first related operation of a LAN service based on the LAN-service-related information.

According to an eleventh aspect, an embodiment of this disclosure provides a terminal, including: an obtaining module, configured to obtain first information, where the first information includes at least one of the following: LAN-service-related configuration information, LAN-service-relay-related configuration information, and LAN-related route selection policy information; and an execution module, configured to perform a second related operation of a LAN service based on the first information.

According to a twelfth aspect, an embodiment of this disclosure provides a terminal, including: a transmitting module, configured to transmit first request information, where the first request information includes at least one of the following: request information for joining a target LAN and request information for serving as a relay for the target LAN.

According to a thirteenth aspect, an embodiment of this disclosure provides a network-side device, including: a judgment module, configured to determine whether a preset condition is satisfied; and an execution module, configured to perform a third related operation of a LAN service if the preset condition is satisfied.

According to a fourteenth aspect, an embodiment of this disclosure provides a terminal, including: an obtaining module, configured to obtain second information, where the second information includes at least one of the following: LAN-relay-related information of a target LAN, LAN-related information of the target LAN, information about whether joining the target LAN is allowed, and information about whether serving as a relay for the target LAN is allowed; and an execution module, configured to perform a fourth related operation of a LAN service based on the second information.

According to a fifteenth aspect, an embodiment of this disclosure provides a communications device, including a processor, a memory, and a computer program stored in the memory and capable of running on the processor, where when the computer program is executed by the processor, the steps of the foregoing method for controlling a LAN service are implemented.

According to a sixteenth aspect, an embodiment of this disclosure provides a computer-readable storage medium, where the computer-readable storage medium stores a program, and when the computer program is executed by a processor, the steps of the foregoing method for controlling a LAN service are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. In addition, throughout the accompanying drawings, the same components are denoted by the same reference numerals. In the drawings.

DESCRIPTION OF EMBODIMENTS

In embodiments of this disclosure, a LAN service (also referred to as a LAN type service) may be a private communication service provided on a communications network (for example, a 3rd Generation Partnership Project (3GPP) network). A 5G LAN type service is a private communication service provided on a 5G communications network. The private communication service may be of an Internet Protocol (IP)-based type or a non-IP type. An example of non-IP type communication is Ethernet. The LAN service may be deployed on a private communications network or a public communications network.

In another embodiment of this disclosure, a LAN may also be referred to as a local area network. The LAN may provide private communication services for a group of devices (such as terminals). The LAN may be deployed based on at least one of the following: a port, an IP subnet, a virtual local area network (VLAN), and a medium access control (MAC) address. The VLAN is a technology that logically divides a physical local area network into a plurality of broadcast domains. With the disposed VLAN, a transmitting range of data can be isolated and security of communication within the VLAN can be improved.

A terminal that supports the LAN service may access one or more LANs. The terminal that supports the LAN type service may leave an already accessed LAN. Generally, only member devices are allowed to access the LAN. For some open LANs, temporary access by non-member devices can also be supported.

In the embodiments of this disclosure, a private virtual network (PVN) may be a private virtual network that supports LAN-type services. The concepts of PVN and LAN may be used interchangeably and may refer generally to a network that supports private communication services or a group of devices that support private communication services.

Figure 1:
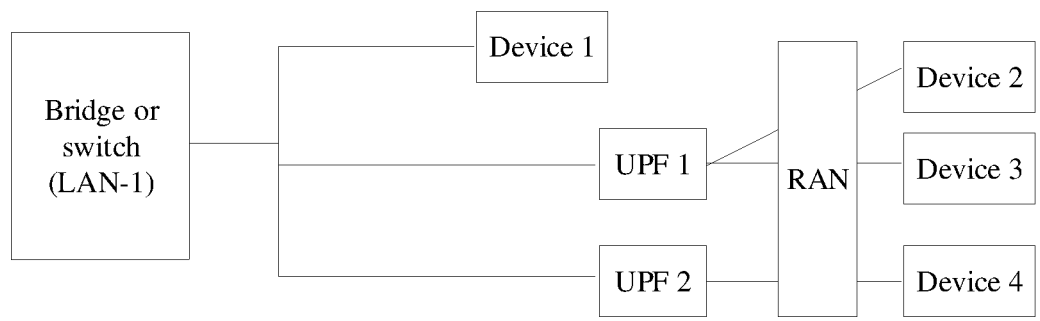
FIG. 1 is a schematic structural diagram of a LAN service system according to an embodiment of this disclosure.
Figure 2:
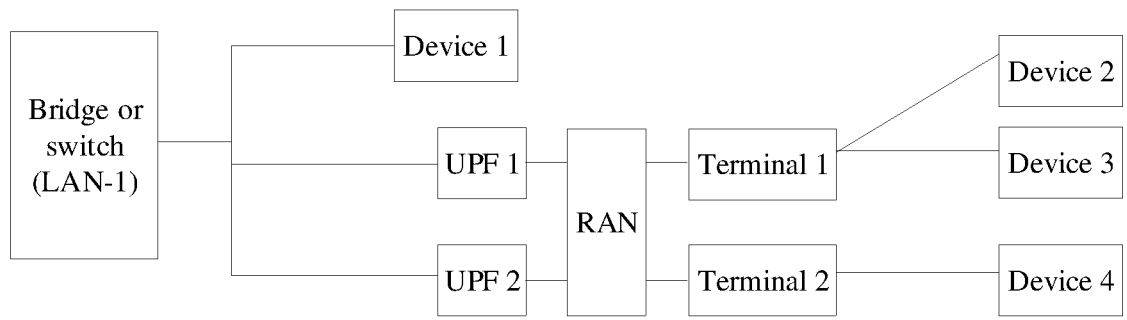
FIG. 2 is a schematic structural diagram of a LAN service system according to another embodiment of this disclosure.

Referring to FIG. 1 and FIG. 2, FIG. 1 and FIG. 2 are schematic structural diagrams of LAN service systems according to the embodiments of this disclosure. In FIG. 1, a LAN device (a device on the right side of a user interface function (UPF) in FIG. 1) may directly access a LAN through a mobile communications network.

In FIG. 2, the LAN device (the device on the right side of the UPF in FIG. 1) may also access the LAN through a terminal (in this case, the terminal of the mobile communications network serves as a relay) of the mobile communications network.

To support the LAN services, the following problems need to be resolved:

Question 1: One terminal is allowed to join one or more LANs (the LANs may also be referred to as a LAN group). In a location of the terminal, it is still unclear which LANs exist, which LANs allow the terminal to join, which LANs do not allow the terminal to join, whether there is a restriction on a service scope of the LAN, which locations the LAN can be accessed from, and which locations the LAN cannot be accessed from.

Question 2: An architecture of the LAN service is unclear. The LAN can be deployed in several manners: (1) The LAN is deployed in one communications network (such as a 5G network). (2) The LAN is deployed on a plurality of communications networks (such as 5G networks), for example, cross-operator networks such as cross-private communications networks (private networks) and public communications networks (public networks). (3) The LAN is deployed on a mobile communications network (such as a 3GPP network) and other non-mobile communications networks (such as wired communication). In this case, control of the LAN service is not suitable for enhancement in core network (CN) devices. Architecturally, a network functional unit at an application layer, such as a LAN control function, may be required.

Question 3: Configuration information required for accessing a LAN for communication is unclear.

One intra-LAN transmission mechanism may be (1) MAC-based (for example, Ethernet); (2) Internet Protocol (IP)-based network; or (3) virtual local area network (VLAN)-based. The VLAN may be in a plurality of manners, for example, based on an IP subnet, based on a media access control (MAC) address, based on a port, and based on a VLAN protocol (such as, 802.1Q).

In an IP-network-based manner, if the terminal is to access the LAN, the terminal first accesses a gateway supporting the LAN (such as a UPF). In a relay manner, to join one LAN, a relay within the LAN may alternatively be selected. It is still unclear about information about how to configure and select a gateway or relay that supports the LAN (DNN and slice information).

In a VLAN-based manner, the terminal requires VLAN tag information during data transmission, and how to obtain VLAN tag information of an accessed LAN is still unclear.

In a MAC-based manner, the terminal needs to obtain a MAC address for LAN communication.

Question 3: How to support one-to-one communication within a LAN.

To communicate with other devices in the LAN, the terminal needs to obtain address information of a member in the LAN or address information of a server in advance. To participate in multicast or initiate multicast, the terminal needs a multicast address.

Question 4: An application on the terminal may be an application allowed to access a LAN (for example, a printer application) or not allowed to access the LAN. It is still unclear how to restrict establishment of a data channel for the application.

The following describes the intra-LAN transmission mechanism with reference to FIG. 1 and FIG. 2.

Referring to FIG. 1, in a user plane diagram of the LAN shown in FIG. 1, a terminal serves as a device in the LAN.

In FIG. 1, a device 1 accesses the LAN through a wired connection.

A device 2, a device 3, and a device 4 access the LAN through a wireless connection (RAN).

In an IP-subnet-based manner, the UPF needs to map addresses within an IP subnet for the device 2, device 3, and device 4.

In a VLAN-based manner:

A VLAN tag is added for the terminal, and the UPF performs routing based on the VLAN.

Alternatively, a VLAN tag is not added for the terminal, and a VLAN tag (also referred to as a VLAN identifier) is added for the UPF in place of the device 2, device 3, and device 4 before routing.

In a MAC-based manner, the UPF needs to bind a MAC-LAN relationship.

In a port-based manner, the UPF needs to bind a MAC-port relationship.

Referring to FIG. 2, in a user plane diagram of the LAN shown in FIG. 2, a terminal serves as a relay for a LAN device. A relay manner may be IP-based or non-IP-based (for example, in an Ethernet-based manner).

The device 1 is connected to the LAN through a wired connection.

Terminals 1 and 2 access the LAN through a wireless connection.

Devices 2 and 3 access the LAN through the terminal 1.

A device 4 accesses the LAN through the terminal 2.

In an IP-subnet-based manner, the terminal needs to map addresses within the IP subnet for the device 2, device 3, and device 4.

In a VLAN-based manner:

A VLAN tag is added for the device, and the terminal merely forwards a packet.

Alternatively, a VLAN tag is not added for the device, and a VLAN tag (also referred to as a VLAN identifier) is added for the terminal in place of the device 2, device 3, and device 4 before routing.

Alternatively, a VLAN tag is not added for both the terminal and the device, and a VLAN tag (also referred to as a VLAN identifier) is added for the UPF in place of the device 2, device 3, and device 4 before routing. The UPF cannot distinguish unless a data channel is bound to a VLAN.

In a MAC-based manner, the terminal needs to bind a MAC-LAN relationship.

In a port-based manner, the terminal needs to bind a MAC-port relationship.

Figure 3:
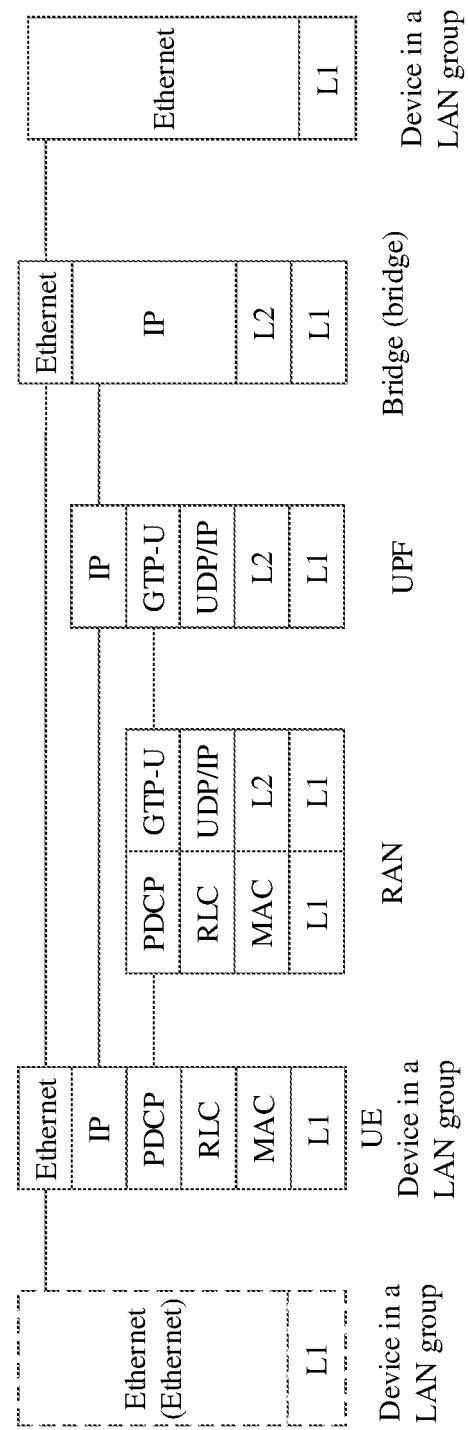
FIG. 3 is a schematic diagram of a protocol stack for Ethernet-based transmission in a LAN according to an embodiment of the disclosure.
Figure 4:
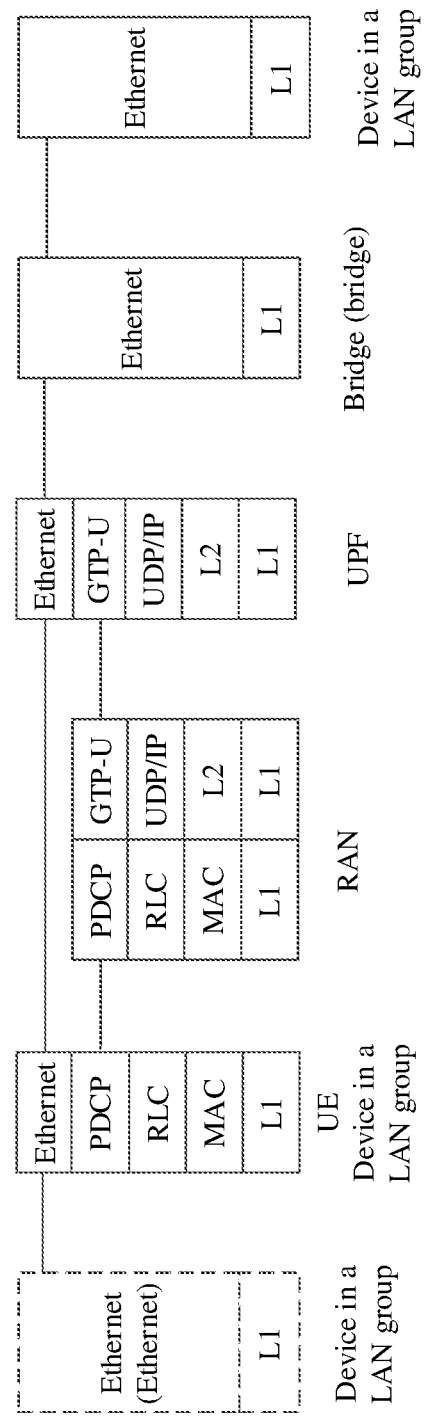
FIG. 4 is a schematic diagram of a protocol stack for Ethernet-based transmission in a LAN according to another embodiment of the disclosure.

Referring to FIG. 3 and FIG. 4, FIG. 3 and FIG. 4 are schematic diagrams of protocol stacks for intra-LAN transmission in an Ethernet-based manner. In FIG. 3, a terminal is a device in a LAN, and in FIG. 4, a terminal is a relay for a LAN device.

Figure 5:
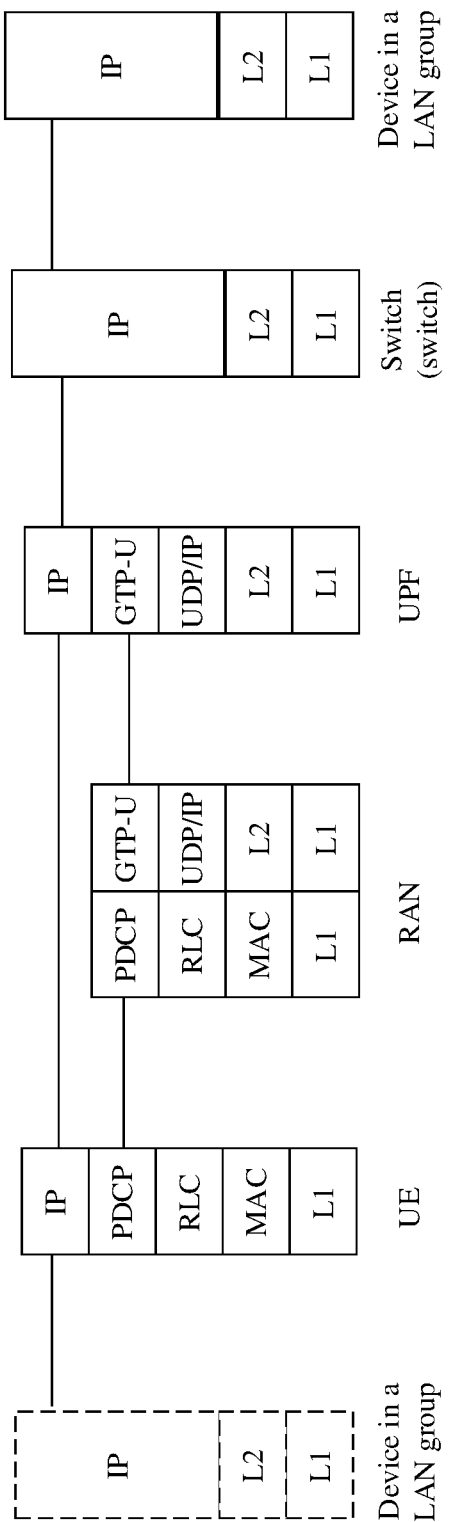
FIG. 5 is a schematic diagram of a protocol stack for IP-based transmission in a LAN according to an embodiment of the disclosure.

Referring to FIG. 5, FIG. 5 is a schematic diagram of a protocol stack for IP-based transmission in a LAN. In FIG. 5, a terminal serves as a device in the LAN.

Some of the terms included in the embodiments of this disclosure are as follows:

In the embodiments of this disclosure, "being connected to a LAN", "accessing a LAN", or "joining a LAN" may mean the same, and may be used interchangeably. Accessing a LAN may represent at least one of the following: a terminal is connected to the LAN, and the terminal becomes a member of the LAN.

In the embodiments of this disclosure, "being connected to a LAN type service", "accessing a LAN type service", or "joining a LAN type service" may mean the same, and may be used interchangeably.

In the embodiments of this disclosure, "leaving a LAN" may represent at least one of the following: not participating in LAN communication, leaving a service scope of the LAN, not allowed to access the LAN, and not being a member of the LAN.

In the embodiments of this disclosure, "leaving a LAN type service" may represent at least one of the following: not participating in a LAN type service, leaving a service scope of the LAN type service, not allowing the LAN type service, and not supporting the LAN type service (for example, a LAN type service capability is disabled).

In the embodiments of this disclosure, a LAN management function may also be referred to as a LAN control function or a LAN function. The LAN management function may be used to manage a LAN type service, such as authorization of the LAN type service or intra-LAN communication. The LAN management function may be combined with other network elements such as an AMF, or may be an independent network element, which may be determined based on an actual requirement. This is not limited in the embodiments of this disclosure.

In the embodiments of this disclosure, "LAN service" and "LAN type service" may mean the same, and may be used interchangeably.

In the embodiments of this disclosure, VLAN information includes at least one of the following: type information of a VLAN and identification information of the VLAN.

In the embodiments of this disclosure, the identification information of the VLAN may also be referred to as tag information of the VLAN. In one implementation, the VLAN may be a VLAN defined in IEEE 802.1Q. The identification information of the VLAN may further include at least one of the following: S-TAG VID, C-TAG VID, and PCP.

The VLAN may include at least one of the following types: a port-based VLAN, an IP-subnet-based VLAN, a VLAN-protocol-based VLAN, and a MAC-address-based VLAN.

In the embodiments of this disclosure, a private communications network may be referred to as a private network. The private communications network may be a virtual private communications network (PVN), a Type A network, or a Type B network.

In the embodiments of this disclosure, a public communications network may be referred to as a public network. The public communications network may include a public land mobile network (PLMN).

In the embodiments of this disclosure, route selection policy information may be referred to as at least one of the following: a route policy of an application and a terminal route selection policy (UE Route Selection Policy, URSP).

In the embodiments of this disclosure, a LAN that an application is allowed to access may be understood as an application-associated LAN or an application of the LAN. In an implementation, when an application generates data, the terminal may access a LAN allowed for the application and transmit the data of the application to the LAN. One application may merely be able to access a LAN for communication or may simultaneously access the LAN and a public network.

In the embodiments of this disclosure, "data" and "data packet" may mean the same, and may be used interchangeably.

In the embodiments of this disclosure, obtaining may be understood as at least one of the following: obtaining from configuration, obtaining through receiving, obtaining through receiving upon a request, obtaining through self-learning, obtaining through deduction based on non-received information, or obtaining through processing received information, for example, when some capability indication information sent by a device is not received, it can be deduced that the device does not support the capability. This may be specifically determined based on an actual requirement, and is not limited in the embodiments of this disclosure.

In the embodiments of this disclosure, the application may be an application or a driver mounted on the terminal.

In the embodiments of this disclosure, a communications device may include a terminal and a network-side device.

The terminal may also be called a user terminal (User Equipment, UE). During specific implementation, the terminal may be a terminal-side device such as a mobile phone, a tablet personal computer, a laptop computer, or a personal digital assistant (PDA), a mobile Internet device (MID), a wearable device, or an in-vehicle device, a drone, a device that supports a communication function, a relay that supports a terminal function, or a terminal that supports a relay function. The terminal may be any one or a combination of the following: a ME, a chip, a card (such as a SIM, a UICC (Universal Integrated Circuit Card (UICC), or a universal subscriber identity module (USIM)). It should be noted that a specific type of the terminal is not limited in the embodiments of this disclosure.

The network-side device may include at least one of the following: a radio access network (Radio Access Network, RAN) network element and a core network (CN) network element.

Further, the CN network element may include but is not limited to at least one of the following: a core network device, a core network node, a core network function, a core-network network unit, a mobility management entity (MME), an access mobility management function (Access Management Function, AMF), a session management function (SMF), a user plane function (UPF), a serving gateway (SGW), a PDN gateway (PDN Gate Way), a policy control function (PCF), a policy and charging rules function unit (PCRF), a GPRS service support node (Serving GPRS Support Node, SGSN), a gateway GPRS support node (GGSN), a LAN control function, unified data management (UDM), a policy control function (PCF), or a LAN application server.

In the embodiments of this disclosure, the LAN control function may also be referred to as a LAN management function or a LAN function. The LAN control function may be used to control a LAN type service, such as authorization of the LAN type service or intra-LAN communication.

The RAN network element may include but is not limited to at least one of the following: a radio access network device, a radio access network node, a radio access network function, a radio-access-network network unit, a 3GPP radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (N3IWF), an access controller (AC) node, an access point (AP) device, or a wireless local area network (WLAN) node.

A base station may be a base transceiver station (BTS) in GSM or CDMA, or may be a NodeB in WCDMA, or may be an evolved NodeB (eNB or e-Node B) in LTE, an ng-eNB, or a 5G NodeB (gNB), which is not limited in the embodiments of this disclosure.

The following clearly and completely describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the terms such as "an example" or "for example" are intended to present a related concept in a specific manner.

Figure 6:
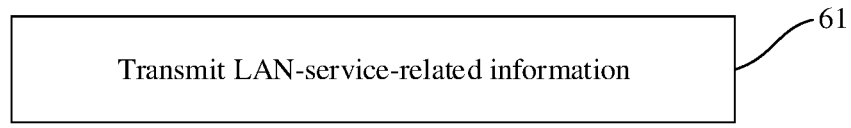
FIG. 6 is a schematic flowchart of a method for controlling a LAN service according to an embodiment of this disclosure.

Referring to FIG. 6, FIG. 6 illustrates a method for controlling a LAN service according to an embodiment of this disclosure. The control method is applied to a first communications device, and the control method includes the following steps.

Step 61: Transmit LAN-service-related information, where the LAN-service-related information may include at least one of the following: LAN service capability information of a terminal, location information of the terminal, LAN service subscription information, and LAN service request information.

In this embodiment of this disclosure, the first communications device may be at least one of the following: a terminal and a unified data management (UDM). The terminal may include a terminal having a relay function.

When the first communications device is a terminal, the LAN-service-related information may include at least one of the following: the LAN service capability information of the terminal, the location information of the terminal, and the LAN service request information.

When the first communications device is a UDM, the LAN-service-related information may include the LAN service subscription information.

In this embodiment of this disclosure, the first communications device may transmit the LAN-service-related information to a third communications device. The third communications device may include at least one of the following: a network-side device, a terminal (for example, a terminal serving as a relay), an AMF, and a LAN management function.

Optionally, the LAN service capability information of the terminal includes at least one of the following: whether a LAN service is supported and whether serving as a LAN service relay is supported.

Optionally, the LAN service request information includes at least one of the following: a request for serving as a LAN service relay and a request for accessing a LAN service.

If the LAN-service-related information includes the LAN service request information, and further, the step of transmitting LAN-service-related information includes:

transmitting the LAN service request information when a preset condition is satisfied; where the preset condition includes that LAN service capability information of a network is obtained.

In this embodiment of this disclosure, the first communications device may obtain the LAN service capability information of the network from at least one of a terminal (such as a terminal having a relay function), a RAN network element, and a CN network element.

Optionally, the LAN service capability information of the network includes at least one of the following: indication information about whether a LAN service is supported, LAN-related information of a supported LAN, and LAN-related information of an unsupported LAN.

In this embodiment of this disclosure, the first communications device transmits the LAN-service-related information related to the terminal, so that the third communications device (such as a network-side device) that receives the LAN-service-related information can perform a corresponding LAN-service-related operation based on the LAN-service-related information.

Figure 7:
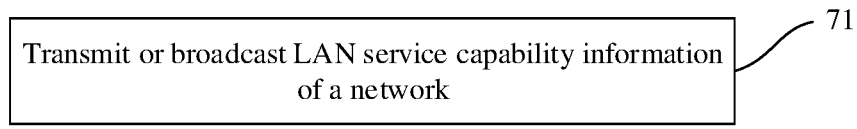
FIG. 7 is a schematic flowchart of a method for controlling a LAN service according to an embodiment of this disclosure.

Referring to FIG. 7, FIG. 7 illustrates a method for controlling a LAN service according to an embodiment of this disclosure. The control method is applied to a second communications device, and the control method includes the following steps.

Step 71: Transmit LAN service capability information of a network.

In this embodiment of this disclosure, the second communications device may include at least one of the following: a terminal (such as a terminal having a relay function), a RAN network element, and a CN network element.

In an implementation, the LAN service capability information of the network may be included in system information.

In this embodiment of this disclosure, the second communications device may transmit the LAN service capability information of the network to a first communications device.

Optionally, the LAN service capability information of the network includes at least one of the following: indication information about whether a LAN service is supported, LAN-related information of a supported LAN, and LAN-related information of an unsupported LAN.

In this embodiment of this disclosure, the second communications device may transmit the LAN service capability information of the network to the first communications device, so that the first communications device may determine, based on the LAN service capability information of the network, whether to transmit LAN service request information.

Figure 8:
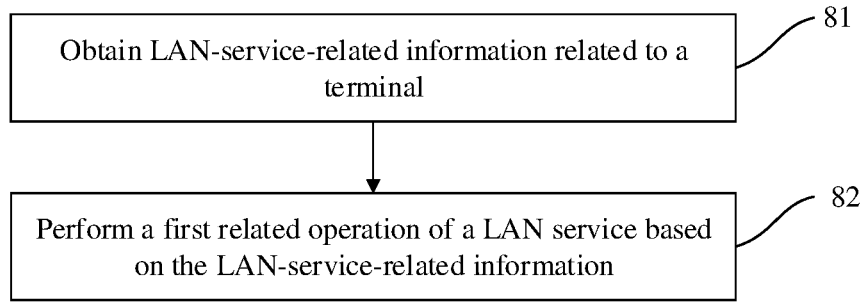
FIG. 8 is a schematic flowchart of a method for controlling a LAN service according to an embodiment of this disclosure.

Referring to FIG. 8, FIG. 8 illustrates a method for controlling a LAN service according to an embodiment of this disclosure. The control method is applied to a third communications device, and the control method includes the following steps.

Step 81: Obtain LAN-service-related information related to a terminal, where the LAN-service-related information includes at least one of the following: a LAN service capability of the terminal, location information of the terminal, LAN service subscription information, and LAN service request information.

Step 82: Perform a first related operation of a LAN service based on the LAN-service-related information.

In this embodiment of this disclosure, the third communications device may include at least one of the following: a network-side device, an AMF, a LAN control function, and a terminal (for example, a terminal serving as a relay).

In this embodiment of this disclosure, the third communications device may obtain, from the first communications device, the LAN-service-related information related to the terminal. The first communications device may be at least one of the following: a terminal and a UDM.

When the third communications device obtains, from the terminal, the LAN-service-related information related to the terminal, the LAN-service-related information may include at least one of the following: the LAN service capability of the terminal, the location information of the terminal, and the LAN service request information.

When the communications device obtains, from the UDM, the LAN-service-related information related to the terminal, the LAN-service-related information may include the LAN service subscription information.

Optionally, the LAN service capability information of the terminal includes at least one of the following: whether a LAN service is supported and whether serving as a LAN service relay is supported.

Optionally, the LAN service request information includes at least one of the following: a request for serving as a LAN service relay and a request for accessing a LAN service.

Optionally, the first related operation of the LAN service includes at least one of the following:

configuring LAN-service-related configuration information for the terminal;
configuring LAN-service-relay-related configuration information for the terminal;
configuring LAN-related route selection policy information for the terminal;
transmitting the LAN-service-related configuration information;
transmitting the LAN-service-relay-related configuration information;
transmitting the LAN-related route selection policy information;
transmitting LAN-related information of a LAN that the terminal is allowed to join; and
transmitting LAN-related information of a LAN that the terminal is not allowed to join.

In this embodiment of this disclosure, at least one of the following may be transmitted to a first target end:

transmitting the LAN-service-related configuration information to the first target end;
transmitting the LAN-service-relay-related configuration information to the first target end; and
transmitting the LAN-related route selection policy information to the first target end.

In this embodiment of this disclosure, at least one of the following may be transmitted to a second target end:

transmitting, to the second target end, LAN-related information of a LAN that the terminal is allowed to join; and
transmitting, to the second target end, LAN-related information of a LAN that the terminal is not allowed to join.

The first target end and the second target end may be the same or different. The first target end may be a terminal and/or a UDM. The second target end may also be a terminal and/or a UDM.

Optionally, the LAN-service-related configuration information includes at least one of the following:

information about whether the LAN service is allowed;
service scope information of the LAN service;
LAN-related information of a LAN allowed to join;
LAN-related information of a LAN not allowed to join;
information of a DNN supporting the LAN service; and
information of a slice supporting the LAN service.

In an implementation, based on a different location of the terminal, a LAN allowed to join may be different.

Optionally, the LAN-service-relay-related configuration information includes at least one of the following:

information about whether serving as a LAN service relay is allowed;
service scope information of the LAN service relay;
LAN-relay-related information of a LAN that allows relaying;
LAN-relay-related information of a LAN that does not allow relaying;
LAN-related information of the LAN that allows relaying; and
LAN-related information of the LAN that does not allow relaying.

Optionally, the LAN-related route selection policy information includes at least one of the following:

whether an application is allowed to access (which may also be referred to as being associated with) the LAN service;
LAN-related information of a LAN that the application is allowed to access;
LAN-related information of a LAN that the application is not allowed to access;
data network name (DNN) information of a LAN associated with the application; and
slice information of the LAN associated with the application.

Optionally, the performing a first related operation of a LAN service based on the LAN-service-related information includes:

if a preset condition is met, performing the first related operation of the LAN service, where the preset condition may include: it is determined that the terminal is located within a service scope of the LAN service.

In this embodiment of this disclosure, the third communications device may obtain the LAN-service-related information related to the terminal, so as to perform a related operation of the LAN service related to the terminal based on the LAN-service-related information related to the terminal.

Figure 9:
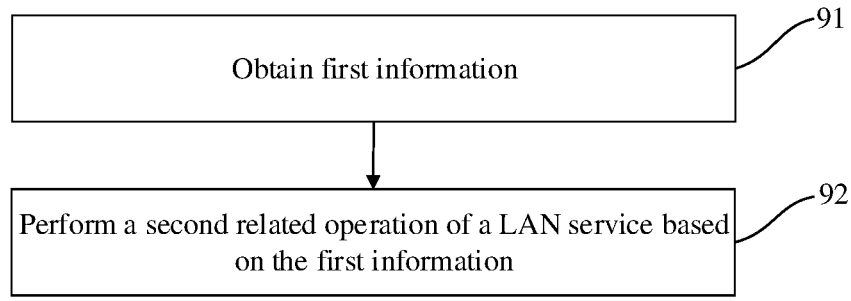
FIG. 9 is a schematic flowchart of a method for controlling a LAN service according to an embodiment of this disclosure.

Referring to FIG. 9, FIG. 9 illustrates a method for controlling a LAN service according to an embodiment of this disclosure. The control method is applied to a terminal, and the control method includes the following steps.

Step 91: Obtain first information, where the first information includes at least one of the following: LAN-service-related configuration information, LAN-service-relay-related configuration information, and LAN-related route selection policy information; and Step 92: Perform a second related operation of a LAN service based on the first information.

In this embodiment of this disclosure, the terminal may include at least one of the following: a terminal supporting a relay function, and a terminal not supporting a relay function.

In this embodiment of this disclosure, the terminal obtains the information from a communications device, where the communications device may include at least one of the following: a LAN application server, a LAN control function, a UDM, an AMF, an SMF, and a PCF.

Optionally, before the step of obtaining the first information, the method further includes: transmitting LAN-service-related information, where the LAN-service-related information includes at least one of the following: LAN service capability information of the terminal, location information of the terminal, and LAN service request information.

Optionally, the LAN service capability information of the terminal includes at least one of the following: whether a LAN service is supported and whether serving as a LAN service relay is supported.

Optionally, the LAN service request information includes at least one of the following: a request for serving as a LAN service relay and a request for accessing a LAN service.

Optionally, the LAN-service-related configuration information includes at least one of the following:
  information about whether the LAN service is allowed;
  service scope information of the LAN service;
  LAN-related information of a LAN allowed to join;
  LAN-related information of a LAN not allowed to join;
  information of a DNN supporting the LAN service; and
  information of a slice supporting the LAN service.

Further, the service scope information of the LAN service may include at least one of the following:
  network identification information of a network supporting the LAN service;
  network type information of the network supporting the LAN service;
  information of a location area supporting the LAN service;
  information of a base station supporting the LAN service; and
  information of a cell supporting the LAN service.

Further, the network type information may include at least one of the following: Type A, Type B, virtual private communications network, and public communications network; and/or further, the network identification information may include at least one of the following: an identifier of a Type A network, an identifier of a Type B network, an identifier of a private communications network, an identifier of a virtual private communications network, and an identifier of a public communications network.

Further, the LAN-related information includes at least one of the following:
  LAN identification information;
  whether multicast is allowed;
  communication address information for multicast in a LAN;
  communication address information of the terminal in the LAN;
  service scope information of the LAN;
  information of a communications device within the LAN;
  information of a DNN supporting the LAN; and
  information of a slice supporting the LAN.

Further, the LAN identification information includes at least one of the following:
  a LAN identifier at an application layer;
  a LAN identifier in a communications network; and
  a LAN identifier at a transport layer.

In an implementation, the communications network includes a 3GPP network.

In an implementation, the LAN identifier at the transport layer includes identification information of a VLAN.

In an implementation, the LAN identifier at the application layer may be assigned by an application layer server. An LAN identifier within the communications network is mapped to the LAN identifier at the application layer in a one-to-one manner.

In an implementation, the LAN identifier at the application layer indicates that a group of terminals include a wired connected terminal and a wirelessly connected terminal. The LAN identifier within the communications network may correspond to a terminal belonging to the LAN in the communications network. The LAN identifier at the application layer may be mapped through the LAN identifier within the communications network, and the LAN identifier within the communications network may be mapped through the LAN identifier at the application layer. Terminals included in a LAN corresponding to the LAN identifier at the application layer may be greater than or equal to terminals in a LAN corresponding to the LAN identifier in the communications network. It is easy to understand that a LAN at the application layer may include users in a plurality of communications networks or users of a non-communications network. With two-layer LAN identifiers, the LAN may be maintained in the communications network and at the application layer, which are loosely coupled.

In another implementation, the LAN identifier at the application layer is mapped to a VLAN in a one-to-one manner. A VLAN identifier is included in a data packet, so as to implement routing in the VLAN.

Further, the service scope information of the LAN includes at least one of the following:
  a network identifier of a network supporting the LAN;
  network type information of the network supporting the LAN;
  information of a location area supporting the LAN;
  information of a base station supporting the LAN; and
  information of a cell supporting the LAN.

The network type information may include at least one of the following: Type A, Type B, private communications network, virtual private communications network, and public communications network; and/or the network identification information may include at least one of the following: an identifier of a Type A network, an identifier of a Type B network, an identifier of a private communications network, an identifier of a virtual private communications network, and an identifier of a public communications network.

Further, the communication address information may include at least one of the following: a port, a media access control (MAC) address, an IP address, and a virtual private communications network (VLAN) identifier. In an implementation, the IP address is an IP address within an IP subnet corresponding to the LAN. Items that can be included in the communication address information of the terminal in the LAN may be consistent with the communication address information. Items that can be included in the communication address information for multicast may be consistent with the communication address information. For example, the IP address for LAN multicast is a multicast IP address, and a MAC address for LAN multicast is a multicast MAC address.

Further, the information of the communications device within the LAN may include communication address information of the communications device within the LAN. In an implementation, the communications device within the LAN is a member of the LAN. Members of the LAN may include at least one of the following: a LAN member that has accessed the LAN for communication and a LAN member that has not accessed the LAN for communication.

Further, the communication address information of the terminal in the LAN may be an IP address or a non-IP address such as a MAC address.

Further, the LAN-service-relay-related configuration information may include at least one of the following:
  information about whether serving as a LAN service relay is allowed;
  service scope information of the LAN service relay;
  LAN-relay-related information of a LAN that allows relaying;
  LAN-relay-related information of a LAN that does not allow relaying;
  LAN-related information of the LAN that allows relaying; and
  LAN-related information of the LAN that does not allow relaying.

Further, the service scope information of the LAN service relay may include at least one of the following: network identification information, network type information, location area information, base station information, and information of a cell supporting the LAN service.

The network type information may include at least one of the following: Type A, Type B, private communications network, virtual private communications network, and public communications network; and/or the network identification information may include at least one of the following: an identifier of a Type A network, an identifier of a Type B network, an identifier of a private communications network, an identifier of a virtual private communications network, and an identifier of a public communications network.

Further, items that can be included in LAN-related information of a LAN that does not allow a relay are consistent with the LAN-related information in the embodiment of FIG. 9, and details are not described herein again.

Further, the LAN-relay-related information may include at least one of the following:
  LAN identification information;
  whether multicast is allowed;
  communication address information for multicast in a LAN;
  communication address information of the terminal in the LAN;
  service scope information of the LAN;
  information of a communications device within the LAN;
  a communication address of the terminal serving as a LAN relay;
  service scope information of the LAN relay; and
  information of a communications device that the LAN relay is allowed to access.

Further, the LAN-related route selection policy information may include at least one of the following:
  whether an application is allowed to access (which may also be referred to as being associated with) the LAN service;
  LAN-related information of a LAN that the application is allowed to access;
  LAN-related information of a LAN that the application is not allowed to access;
  DNN information of a LAN associated with the application; and
  slice information of the LAN associated with the application.

Optionally, the second related operation of the LAN service may include at least one of the following:
  joining a LAN;
  leaving the LAN;
  performing one-to-one communication within the LAN;
  performing one-to-many communication within the LAN; and
  providing a relay service for a communications device within the LAN.

Further, the providing a relay service for a communications device within the LAN may include at least one of the following:
  adding, to a data packet of the relayed communications device, information of a VLAN corresponding to the LAN;
  transmitting a request for joining the LAN for the relayed communications device; and
  transmitting a request for leaving the LAN for the relayed communications device.

In this embodiment of this disclosure, the terminal may obtain LAN-service-related information of a network side, and perform a corresponding LAN service based on the LAN-service-related information of the network side.

Figure 10:
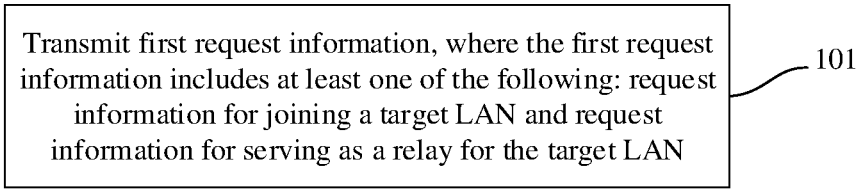
FIG. 10 is a schematic flowchart of a method for controlling a LAN service according to an embodiment of this disclosure.

Referring to FIG. 10, FIG. 10 illustrates a method for controlling a LAN service according to an embodiment of this disclosure. The control method is applied to a terminal, and the control method includes the following steps.

Step 101: Transmit first request information, where the first request information includes at least one of the following: request information for joining a target LAN and request information for serving as a relay for the target LAN.

In an implementation, the request information for joining the target LAN may be request information for joining the target LAN and being a member of the target LAN.

In an implementation, the first request information may be used to request to join the target LAN.

In another implementation, the first request information may be used to request to serve as a relay for the target LAN.

In this embodiment of this disclosure, the terminal may transmit the first request information to a network-side device.

In this embodiment of this disclosure, the terminal transmits the first request information to request to join the target LAN or serve as a relay for the target LAN, so as to implement the LAN service.

Figure 11:
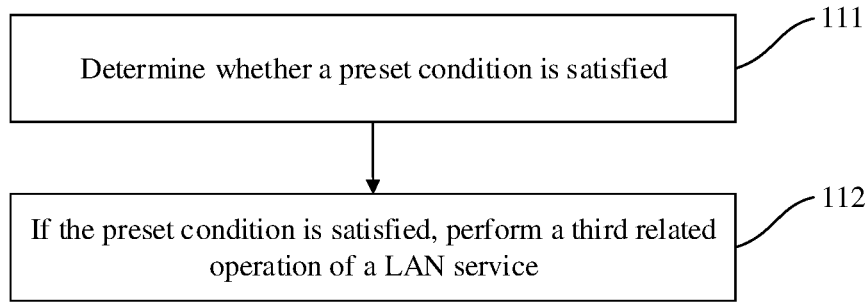
FIG. 11 is a schematic flowchart of a method for controlling a LAN service according to an embodiment of this disclosure.

Referring to FIG. 11, FIG. 11 illustrates a method for controlling a LAN service according to an embodiment of this disclosure. The control method is applied to a network-side device, and the control method includes the following steps.

Step 111: Determine whether a preset condition is satisfied.

Step 112: If the preset condition is satisfied, perform a third related operation of a LAN service.

Optionally, the network-side device in this embodiment of this disclosure may be at least one of the following: a LAN control function and an AMF.

Optionally, the preset condition includes at least one of the following: that first request information is obtained, and that LAN-related information of a target LAN is generated or updated.

Further, items that can be included in the generated or updated LAN-related information of the target LAN are consistent with the LAN-related information in the embodiment of FIG. 9, and details are not described herein again.

Optionally, the first request information includes at least one of the following: request information for joining a target LAN by a terminal and request information for serving as a relay for the target LAN.

In an implementation, the target LAN may be one or more specific LANs.

Optionally, the third related operation of the LAN service includes at least one of the following:

verifying whether the terminal is allowed to join the target LAN;

transmitting information about whether the terminal is allowed to join the target LAN;

verifying whether the terminal is allowed to serve as a relay for the target LAN; and transmitting information about whether the terminal is allowed to serve as a relay for the target LAN.

Further, information about whether the terminal is allowed to join the target LAN may be transmitted to the terminal and/or the UDM.

Further, the information about whether the terminal is allowed to join the target LAN may be information about whether the terminal is allowed to establish a related data channel of the target LAN or whether to establish a related data channel of the target LAN for the terminal. Subsequently, an SMF may refer to this information from the UDM when determining whether to allow establishment of a first-LAN-related data channel of the terminal.

Further, when the terminal is allowed to join the target LAN, the third related operation of the LAN service may include at least one of the following:

configuring LAN-related information of the target LAN for the terminal;

transmitting the LAN-related information of the target LAN; and transmitting LAN-related information of the target LAN that the terminal is allowed to join.

The first target end may be a terminal. The second target end may be a terminal and/or a UDM.

Further, when the terminal is allowed to join the target LAN, the third related operation of the LAN service may further include at least one of the following: adding the terminal to the target LAN, and transmitting updated information of LAN devices in the target LAN to the UDM and/or the LAN devices in the target LAN.

Optionally, the LAN-related information of the target LAN may include at least one of the following: information of members in the target LAN and a communication address in the target LAN.

Further, when the terminal is not allowed to join the target LAN, the third related operation of the LAN service may include: transmitting, to the second target end, the LAN-related information of the target LAN that the terminal is not allowed to join.

Optionally, when the terminal is allowed to serve as the relay for the target LAN, the third related operation of the LAN service may include at least one of the following:

configuring relay-related information of the target LAN for the terminal;

configuring LAN-related information of the target LAN for the terminal;

transmitting relay-related information of the target LAN; and transmitting LAN-related information of the target LAN that the terminal is allowed to join.

When the terminal is not allowed to serve as a relay for the target LAN, the third related operation of the LAN service includes:

transmitting LAN-related information of the target LAN in which the terminal is not allowed to serve as a relay. In this embodiment of this disclosure, a network side may perform a related operation of the target LAN based on a request of the terminal or the generated or updated LAN-related information of the target LAN.

Figure 12:
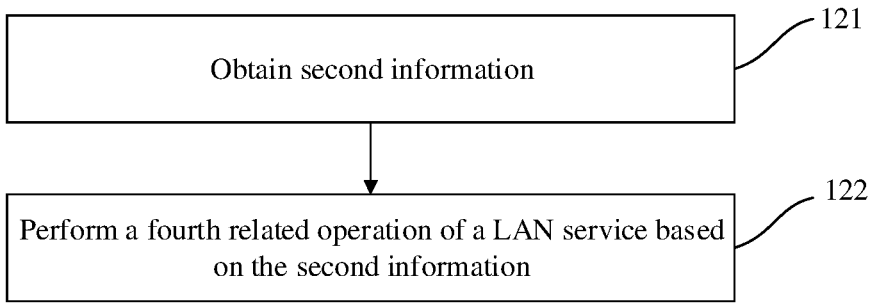
FIG. 12 is a schematic flowchart of a method for controlling a LAN service according to an embodiment of this disclosure.

Referring to FIG. 12, FIG. 12 illustrates a method for controlling a LAN service according to an embodiment of this disclosure. The control method is applied to a terminal, and the control method includes the following steps.

Step 121: Obtain second information, where the second information includes at least one of the following: LAN-relay-related information of a target LAN, LAN-related information of the target LAN, information about whether joining the target LAN is allowed, and information about whether serving as a relay for the target LAN is allowed.

In an implementation, the target LAN may be one or more specific LANs.

Step 122: Perform a fourth related operation of a LAN service based on the second information.

In this embodiment of this disclosure, the terminal may obtain the second information from a network-side device.

Optionally, before the step of obtaining the second information, the method further includes: transmitting first request information, where the first request information includes at least one of the following: request information for joining a target LAN and request information for serving as a relay for the target LAN.

Optionally, the LAN-related information of the target LAN includes at least one of the following:

identification information of the target LAN;

whether multicast is allowed;

communication address information for multicast in the target LAN;

communication address information of the terminal in the LAN;

service scope information of the target LAN;

information of a communications device within the target LAN;

information of a DNN supporting the LAN; and information of a slice supporting the LAN.

Further, the communication address information may include at least one of the following: a port, a MAC address, an IP address, and a virtual private communications network (VLAN) identifier.

Further, the information of the communications device within the target LAN may include communication address information of the device within the target LAN. In an implementation, the communications device within the target LAN is a member of the target LAN. Members of the target LAN may include at least one of the following: a target-LAN member that has accessed the target LAN for communication and a target-LAN member that has not accessed the target LAN for communication.

Optionally, the LAN-relay-related information of the target LAN includes at least one of the following:

identification information of the target LAN;

whether multicast is allowed;

communication address information for multicast in the target LAN;

communication address information of the terminal in the target LAN;

service scope information of the target LAN;

information of a communications device within the target LAN;

a communication address of the terminal serving as a LAN relay;

service scope information of the LAN relay; and information of a communications device that the LAN relay is allowed to access.

Further, the service scope information of the target LAN service relay may include at least one of the following: network identification information, network type information, location area information, base station information, and information of a cell supporting the LAN service.

Optionally, the fourth related operation of the LAN service includes at least one of the following:

joining the target LAN;

leaving the target LAN;

performing one-to-one communication within the target LAN;

performing one-to-many communication within the target LAN; and providing a relay service for a communications device within the target LAN.

Further, the providing a relay service for a communications device within the target LAN may include at least one of the following:

adding, to a data packet of the relayed communications device, information of a VLAN corresponding to the target LAN;

transmitting a request for joining the target LAN for the relayed communications device; and transmitting a request for leaving the target LAN for the relayed communications device.

In this embodiment of this disclosure, the terminal may obtain LAN-related information of the target LAN and perform a corresponding LAN service operation.

The following describes a scenario in which the method embodiment is implemented in combination with a process embodiment.

Embodiment 1

Figure 13:
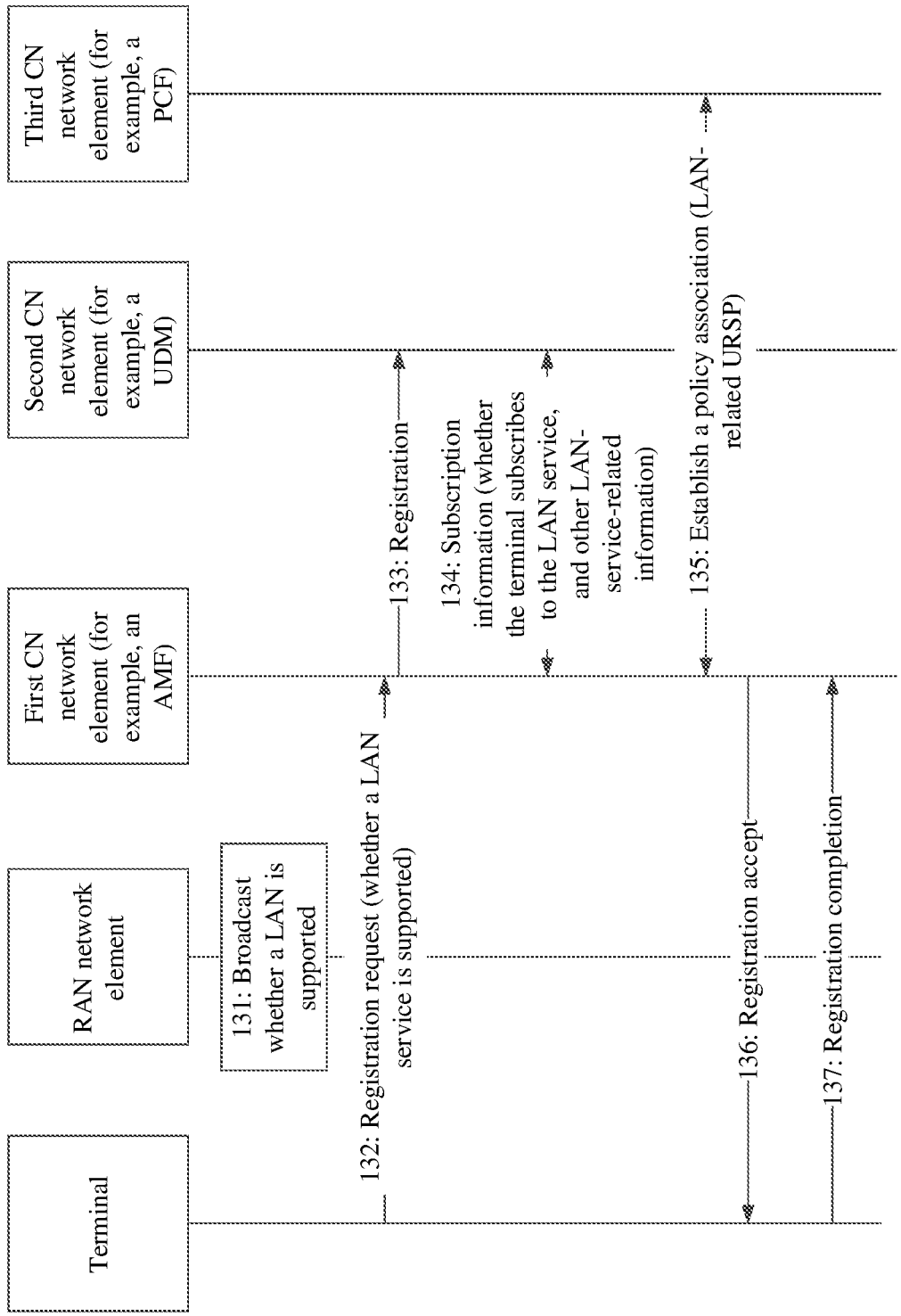
FIG. 13 is a schematic flowchart of a method for controlling a LAN service according to Embodiment 1 of this disclosure.

Referring to FIG. 13, this embodiment mainly describes a process of obtaining a LAN service configuration in a terminal registration process. During the process, the terminal obtains first information, where the first information includes at least one of the following: LAN-service-related configuration information, LAN-service-relay-related configuration information, and LAN-related route selection policy information. In this embodiment, an example of an AMF is a first CN network element, an example of an UDM is a second CN network element, and an example of a PCF is a third CN network element, which are not limited thereto.

Step 131: A RAN network element broadcasts LAN service capability information of a network (as the LAN service capability information of the network described in the embodiment of FIG. 7).

Step 132: A terminal transmits a registration request to the AMF. Optionally, the registration request includes the LAN-service-related information (as the LAN-service-related information described in the embodiment of FIG. 6). The LAN-service-related information may include, for example, LAN service capability information of the terminal.

Optionally, the AMF may obtain location information of the terminal in the LAN-service-related information from a RAN network element accessed by the terminal.

Step 133: The AMF registers with the UDM.

Step 134: The UDM transmits subscription information of the terminal to the AMF. Optionally, the subscription information of the terminal may include the LAN-service-related information (as the LAN-service-related information described in the embodiment of FIG. 6). In this case, the LAN-service-related information may include, for example, LAN service subscription information.

Based on the LAN-service-related information, the AMF performs a first related operation of the LAN service, as described in the embodiment of FIG. 8, and details are not described herein.

Step 135: A policy association is established between the AMF and the PCF.

In an implementation, the AMF may transmit the LAN-service-related information to the PCF.

Based on the LAN-service-related information, the PCF performs the first related operation of the LAN service, as described in the embodiment of FIG. 8, and details are not described herein.

In an implementation, the PCF transmits a URSP to the AMF. Optionally, the URSP includes LAN-related route selection policy information.

Step 136: The AMF network element returns registration accept information to the terminal. Optionally, the registration accept information may include at least one of the following: LAN-service-related configuration information, LAN-service-relay-related configuration information, and LAN-related route selection policy information.

Step 137: The terminal returns registration completion information to the AMF.

In this embodiment of this disclosure, the AMF performs authentication for the LAN service to be performed by the terminal. The AMF and the PCF may perform configuration for the LAN service to be performed by the terminal.

Embodiment 2

Figure 14:
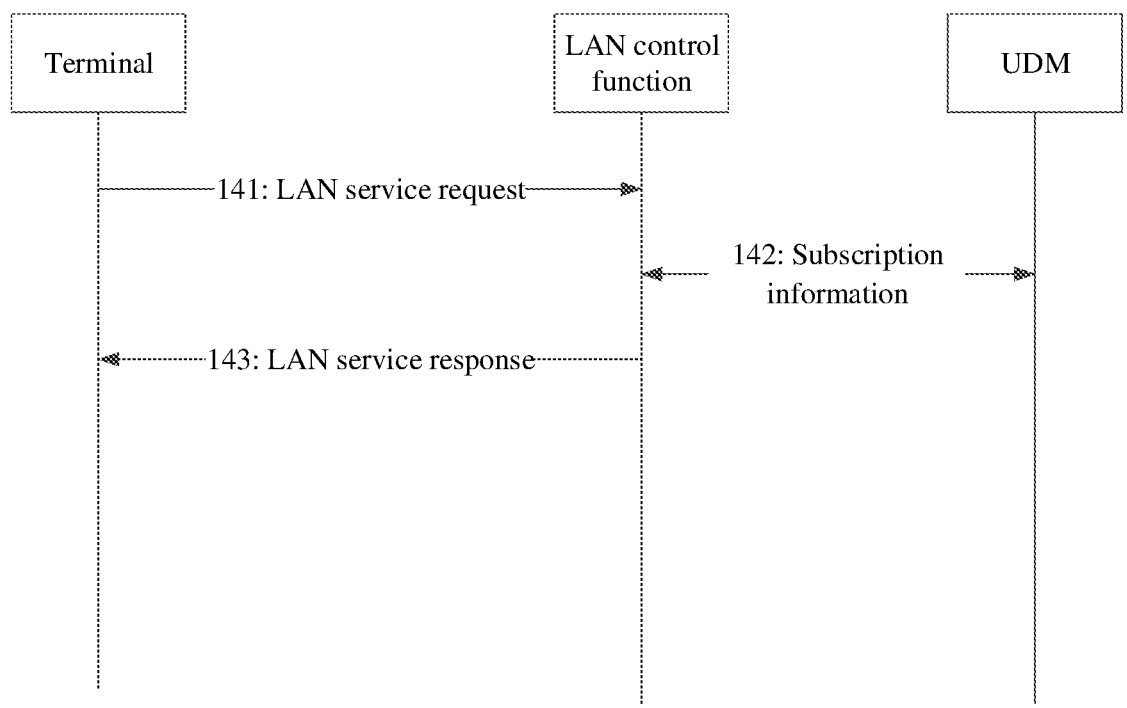
FIG. 14 is a schematic flowchart of a method for controlling a LAN service according to Embodiment 2 of this disclosure.

Referring to FIG. 14, this embodiment mainly describes a process in which a terminal accesses a LAN control function or a process of configuring a LAN service. During the process, the terminal obtains first information, where the first information includes at least one of the following: LAN-service-related configuration information, LAN-service-relay-related configuration information, and LAN-related route selection policy information.

Step 141: The terminal transmits a LAN service request to the LAN control function.

Optionally, the registration request includes the LAN-service-related information (as the LAN-service-related information described in the embodiment of FIG. 6). For example, the LAN-service-related information may include at least one of the following: LAN service capability information of the terminal, location information of the terminal, LAN service subscription information, and LAN service request information.

Step 142: The LAN control function obtains subscription information of the terminal from a UDM. Optionally, the subscription information of the terminal may include the LAN-service-related information (as the LAN-service-related information described in the embodiment of FIG. 6). In this case, the LAN-service-related information may include, for example, LAN service subscription information.

Based on the LAN-service-related information, the AMF performs a first related operation of the LAN service, as described in the embodiment of FIG. 8, and details are not described herein.

Step 143: The terminal receives a LAN service request response transmitted by the LAN control function. The response may include at least one of the following: LAN-service-related configuration information, LAN-service-relay-related configuration information, and LAN-related route selection policy information.

In this embodiment of this disclosure, the LAN control function performs authentication and configuration for the LAN service to be performed by the terminal.

Embodiment 3

Figure 15:
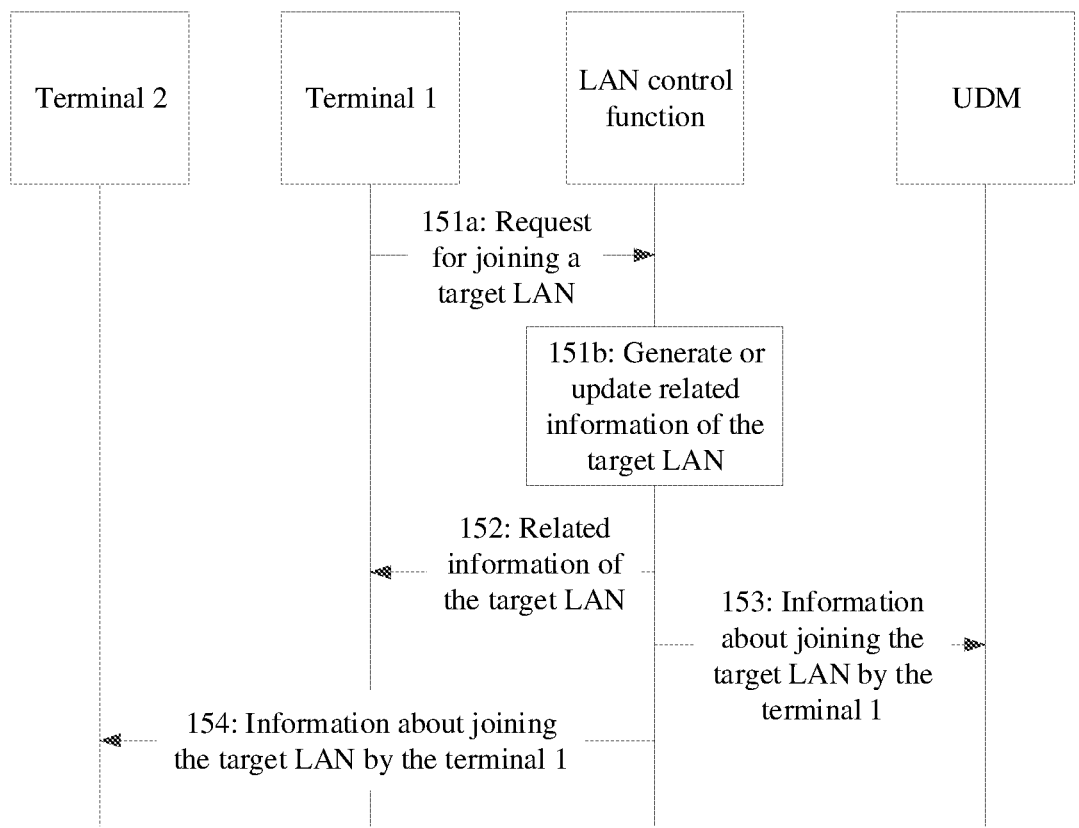
FIG. 15 is a schematic flowchart of a method for controlling a LAN service according to Embodiment 3 of this disclosure.

Referring to FIG. 15, this embodiment mainly describes a process in which a terminal requests to obtain LAN-related information of a target LAN.

Step 151a: A terminal 1 transmits first request information to a LAN control function.

The first request information is specifically the first request information described in the embodiment shown in FIG. 10. The first request information includes at least one of the following: request information for joining a target LAN and request information for serving as a relay for the target LAN.

Step 151b: The LAN control function generates or updates LAN-related information of the target LAN.

Step 152: The LAN control function transmits the LAN-related information of the target LAN to the terminal. The LAN-related information of the target LAN is the LAN-related information of the target LAN described in the embodiment shown in FIG. 11. The LAN-related information of the target LAN may include at least one of the following: LAN-relay-related information of the target LAN, LAN-related information of the target LAN, information about whether joining the target LAN is allowed, and information about whether serving as a relay for the target LAN is allowed.

Step 153: When it is determined that the terminal 1 joins the target LAN, the LAN control function transmits information about joining the target LAN by the terminal 1 to the UDM.

Step 154: When it is determined that the terminal 1 joins the target LAN, the LAN control function transmits information about joining the target LAN by the terminal 1 to a terminal 2. The terminal 2 is a device in the target LAN.

In this embodiment of this disclosure, the LAN control function performs authentication and configuration for the target LAN service to be accessed by the terminal.

Figure 16:
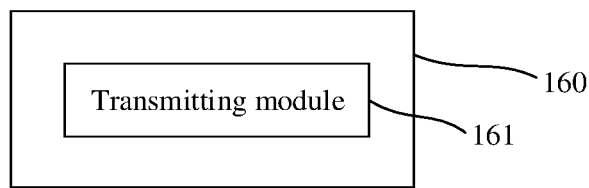
FIG. 16 is a schematic structural diagram of a first communications device according to an embodiment of this disclosure.

Referring to FIG. 16, FIG. 16 is a schematic structural diagram of a first communications device according to an embodiment of this disclosure. The first communications device 160 includes a transmitting module 161, configured to transmit LAN-service-related information, where the LAN-service-related information includes at least one of the following: LAN service capability information of a terminal, location information of the terminal, LAN service subscription information, and LAN service request information. Optionally, the LAN service request information includes at least one of the following: a request for serving as a LAN service relay and a request for accessing a LAN service.

Optionally, the LAN service capability information of the terminal includes at least one of the following: whether a LAN service is supported and whether serving as a LAN service relay is supported.

Further, if the LAN-service-related information includes the LAN service request information, and further, the step of transmitting LAN-service-related information includes:
transmitting the LAN service request information when a preset condition is satisfied; where
the preset condition includes that LAN service capability information of a network is obtained.

The first communications device in this embodiment of this disclosure corresponds to the first communications device in the foregoing method embodiment. Some features related to the first communications device in this embodiment are the same as the corresponding features in the method embodiment corresponding to the first communications device, and therefore, some features are not described again.

Figure 17:
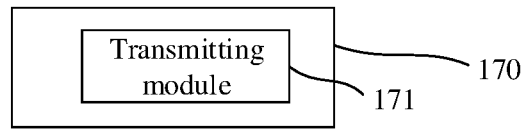
FIG. 17 is a schematic structural diagram of a second communications device according to an embodiment of this disclosure.

Referring to FIG. 17, FIG. 17 is a schematic structural diagram of a second communications device according to an embodiment of this disclosure. The second communications device 170 includes a transmitting module 171, configured to transmit LAN service capability information of a network.

Optionally, the LAN service capability information of the network includes at least one of the following: indication information about whether a LAN service is supported, LAN-related information of a supported LAN, and LAN-related information of an unsupported LAN.

The second communications device in this embodiment of this disclosure corresponds to the second communications device in the foregoing method embodiment. Some features related to the second communications device in this embodiment are the same as the corresponding features in the method embodiment corresponding to the second communications device, and therefore, some features are not described again.

Figure 18:
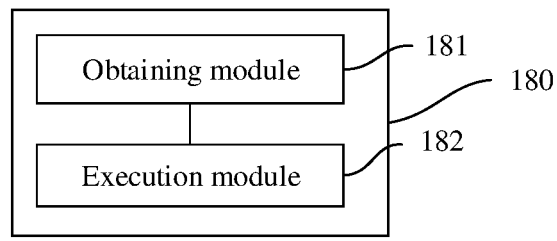
FIG. 18 is a schematic structural diagram of a third communications device according to an embodiment of this disclosure.

Referring to FIG. 18, FIG. 18 is a schematic structural diagram of a third communications device according to an embodiment of this disclosure. The third communications device 180 includes:
an obtaining module 181, configured to obtain LAN-service-related information related to a terminal, where the LAN-service-related information includes at least one of the following: a LAN service capability of the terminal, location information of the terminal, LAN service subscription information, and LAN service request information; and
an execution module 182, configured to perform a first related operation of a LAN service based on the LAN-service-related information.

Optionally, the first related operation of the LAN service includes at least one of the following:
configuring LAN-service-related configuration information for the terminal;
configuring LAN-service-relay-related configuration information for the terminal;
configuring LAN-related route selection policy information for the terminal;
transmitting the LAN-service-related configuration information;
transmitting the LAN-service-relay-related configuration information;
transmitting the LAN-related route selection policy information;
transmitting LAN-related information of a LAN that the terminal is allowed to join; and
transmitting, to the second target end, LAN-related information of a LAN that the terminal is not allowed to join.

Further, the LAN-service-related configuration information may include at least one of the following:
  information about whether the LAN service is allowed;
  service scope information of the LAN service;
  LAN-related information of a LAN allowed to join;
  LAN-related information of a LAN not allowed to join;
  information of a DNN supporting the LAN service; and
  information of a slice supporting the LAN service.

Further, the LAN-service-relay-related configuration information may include at least one of the following:
  information about whether serving as a LAN service relay is allowed;
  service scope information of the LAN service relay;
  LAN-relay-related information of a LAN that allows relaying;
  LAN-relay-related information of a LAN that does not allow relaying;
  LAN-related information of the LAN that allows relaying; and
  LAN-related information of the LAN that does not allow relaying.

Further, the LAN-related route selection policy information may include at least one of the following:
  whether an application is allowed to access the LAN service;
  LAN-related information of a LAN that the application is allowed to access;
  LAN-related information of a LAN that the application is not allowed to access;
  data network name DNN information of a LAN associated with the application; and
  slice information of the LAN associated with the application.

The third communications device in this embodiment of this disclosure corresponds to the third communications device in the foregoing method embodiment. Some features related to the third communications device in this embodiment are the same as the corresponding features in the method embodiment corresponding to the third communications device, and therefore, some features are not described again.

Figure 19:
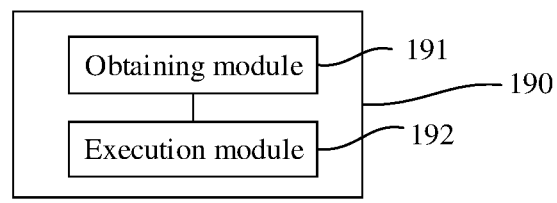
FIG. 19 is a schematic structural diagram of a terminal according to an embodiment of this disclosure.

Referring to FIG. 19, FIG. 19 is a schematic structural diagram of a terminal according to an embodiment of this disclosure. The terminal 190 includes:
  an obtaining module 191, configured to obtain first information, where the first information includes at least one of the following: LAN-service-related configuration information, LAN-service-relay-related configuration information, and LAN-related route selection policy information; and
  an execution module 192, configured to perform a second related operation of a LAN service based on the first information.

Optionally, the terminal 190 further includes:
  a transmitting module, configured to transmit LAN-service-related information, where the LAN-service-related information includes at least one of the following: LAN service capability information of the terminal, location information of the terminal, and LAN service request information.

Optionally, the LAN-service-related configuration information includes at least one of the following:
  information about whether the LAN service is allowed;
  service scope information of the LAN service;
  LAN-related information of a LAN allowed to join;
  LAN-related information of a LAN not allowed to join;
  information of a DNN supporting the LAN service; and
  information of a slice supporting the LAN service.

Further, the service scope information of the LAN service may include at least one of the following:
  network identification information of a network supporting the LAN service;
  network type information of the network supporting the LAN service;
  information of a location area supporting the LAN service;
  information of a base station supporting the LAN service; and
  information of a cell supporting the LAN service.

The network type information includes at least one of the following: Type A, Type B, private communications network, virtual private communications network, and public communications network; and/or
  the network identification information includes at least one of the following: an identifier of a Type A network, an identifier of a Type B network, an identifier of a private communications network, an identifier of a virtual private communications network, and an identifier of a public communications network.

Further, the LAN-related information may include at least one of the following:
  LAN identification information;
  whether multicast is allowed;
  communication address information for multicast in a LAN;
  communication address information of the terminal in the LAN;
  service scope information of the LAN;
  information of a communications device within the LAN;
  information of a DNN supporting the LAN; and
  information of a slice supporting the LAN.

Further, the LAN identification information may include at least one of the following:
  a LAN identifier at an application layer;
  a LAN identifier in a communications network; and
  a LAN identifier at a transport layer.

Further, the service scope information of the LAN includes at least one of the following:
  a network identifier of a network supporting the LAN;
  network type information of the network supporting the LAN;
  information of a location area supporting the LAN;
  information of a base station supporting the LAN; and
  information of a cell supporting the LAN.

The network type information may include at least one of the following: Type A, Type B, private communications network, virtual private communications network, and public communications network; and/or
  the network identification information may include at least one of the following: an identifier of a Type A network, an identifier of a Type B network, an identifier of a private communications network, an identifier of a virtual private communications network, and an identifier of a public communications network.

Further, the communication address information may include at least one of the following: a port, a media access control MAC address, an IP address, and VLAN information. In an implementation, the IP address is an IP address within an IP subnet corresponding to the LAN. Items that can be included in the communication address information of the terminal in the LAN may be consistent with the communication address information. Items that can be included in the communication address information for multicast may be consistent with the communication address information. For example, the IP address for LAN multicast is a multicast IP address, and a MAC address for LAN multicast is a multicast MAC address.

Further, the information of the communications device within the LAN may include communication address information of the communications device within the LAN.

Optionally, the LAN-service-relay-related configuration information includes at least one of the following:
  information about whether serving as a LAN service relay is allowed;
  service scope information of the LAN service relay;
  LAN-relay-related information of a LAN that allows relaying;
  LAN-relay-related information of a LAN that does not allow relaying;
  LAN-related information of the LAN that allows relaying; and
  LAN-related information of the LAN that does not allow relaying.

Further, the service scope information of the LAN service relay may include at least one of the following: network identification information, network type information, location area information, base station information, and information of a cell supporting the LAN service.

Further, the network type information may include at least one of the following: Type A, Type B, private communications network, virtual private communications network, and public communications network.

Further, the network identification information may include at least one of the following: an identifier of a Type A network, an identifier of a Type B network, an identifier of a private communications network, an identifier of a virtual private communications network, and an identifier of a public communications network.

Further, the LAN-relay-related information may include at least one of the following:
  LAN identification information;
  whether multicast is allowed;
  communication address information for multicast in a LAN;
  communication address information of the terminal in the LAN;
  service scope information of the LAN;
  information of a communications device within the LAN;
  communication address information of the terminal serving as a relay in the LAN;
  service scope information of the LAN relay; and
  information of a communications device that the LAN relay is allowed to access.

Further, the information of the communications device within the LAN may include communication address information of the communications device within the LAN. In an implementation, the communications device within the LAN is a member of the LAN. Members of the LAN may include at least one of the following: a LAN member that has accessed the LAN for communication and a LAN member that has not accessed the LAN for communication.

Optionally, the LAN-related route selection policy information includes at least one of the following:
  whether an application is allowed to access the LAN service;
  LAN-related information of a LAN that the application is allowed to access;
  LAN-related information of a LAN that the application is not allowed to access;
  DNN information of a LAN associated with the application; and
  slice information of the LAN associated with the application.

Optionally, the second related operation of the LAN service includes at least one of the following:
  joining a LAN;
  leaving the LAN;
  performing one-to-one communication within the LAN;
  performing one-to-many communication within the LAN; and
  providing a relay service for a communications device within the LAN.

Further, the providing a relay service for a communications device within the LAN may include at least one of the following:
  adding, to a data packet of the relayed communications device, information of a VLAN corresponding to the LAN;
  transmitting a request for joining the LAN for the relayed communications device; and
  transmitting a request for leaving the LAN for the relayed communications device.

The terminal in this embodiment of this disclosure corresponds to the terminal in the foregoing Embodiment 4. Some features related to the terminal in this embodiment are the same as the corresponding features in the method embodiment of Embodiment 4, and therefore, some features are not described again.

Figure 20:
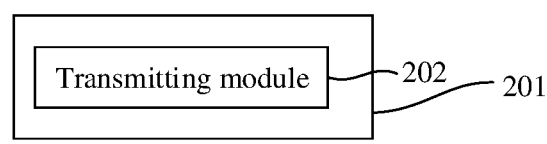
FIG. 20 is a schematic structural diagram of a terminal according to an embodiment of this disclosure.

Referring to FIG. 20, FIG. 20 is a schematic structural diagram of a terminal according to an embodiment of this disclosure. The terminal 201 includes a transmitting module 202, configured to transmit first request information, where the first request information includes at least one of the following: request information for joining a target LAN and request information for serving as a relay for the target LAN.

The terminal in this embodiment of this disclosure corresponds to the terminal in the foregoing Embodiment 5. Some features related to the terminal in this embodiment are the same as the corresponding features in the method embodiment of Embodiment 5, and therefore, some features are not described again.

Figure 21:
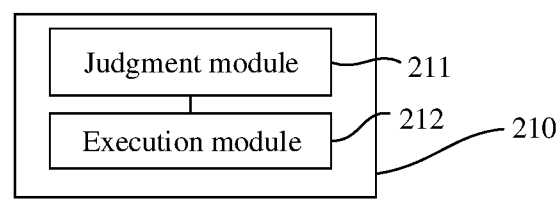
FIG. 21 is a schematic structural diagram of a network-side device according to an embodiment of this disclosure.

Referring to FIG. 21, FIG. 21 is a schematic structural diagram of a network-side device according to an embodiment of this disclosure. The network-side device 210 includes:
  a judgment module 211, configured to determine whether a preset condition is satisfied; and
  an execution module 212, configured to perform a third related operation of a LAN service if the preset condition is satisfied.

Optionally, the preset condition includes at least one of the following: that first request information is obtained, and that LAN-related information of a target LAN is generated or updated.

The first request information includes at least one of the following: request information for joining a target LAN by a terminal and request information for serving as a relay for the target LAN.

Optionally, the third related operation of the LAN service includes at least one of the following:
  verifying whether the terminal is allowed to join the target LAN;
  transmitting information about whether the terminal is allowed to join the target LAN;
  verifying whether the terminal is allowed to serve as a relay for the target LAN; and
  transmitting information about whether the terminal is allowed to serve as the relay for the target LAN.

Further, when the terminal is allowed to join the target LAN, the third related operation of the LAN service may include at least one of the following:
- configuring LAN-related information of the target LAN for the terminal;
- transmitting the LAN-related information of the target LAN; and
- transmitting LAN-related information of the target LAN that the terminal is allowed to join.

When the terminal is not allowed to join the target LAN, the third related operation of the LAN service may include: transmitting, to a second target end, the LAN-related information of the target LAN that the terminal is not allowed to join.

Further, when the terminal is allowed to serve as the relay for the target LAN, the third related operation of the LAN service may include at least one of the following:
- configuring relay-related information of the target LAN for the terminal;
- configuring LAN-related information of the target LAN for the terminal;
- transmitting relay-related information of the target LAN; and
- transmitting LAN-related information of the target LAN that the terminal is allowed to join.

When the terminal is not allowed to serve as the relay for the target LAN, the third related operation of the LAN service includes: transmitting the LAN-related information of the target LAN in which the terminal is not allowed to serve as a relay.

Further, the information about whether the terminal is allowed to join the target LAN may be information about whether the terminal is allowed to establish a related data channel of the target LAN or whether to establish a related data channel of the target LAN for the terminal.

The network-side device in this embodiment of this disclosure corresponds to the network-side device in the foregoing Embodiment 6. Some features related to the network-side device in this embodiment are the same as the corresponding features in the method embodiment of Embodiment 6, and therefore, some features are not described again.

Figure 22:
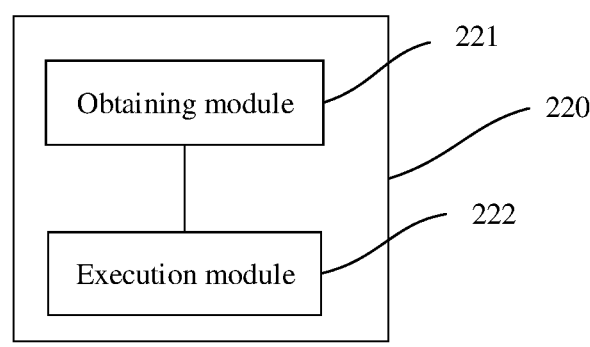
FIG. 22 is a schematic structural diagram of a terminal according to an embodiment of this disclosure.

Referring to FIG. 22, FIG. 22 is a schematic structural diagram of a terminal according to an embodiment of this disclosure. The terminal 220 includes:
- an obtaining module 221, configured to obtain second information, where the second information includes at least one of the following: LAN-relay-related information of a target LAN, LAN-related information of the target LAN, information about whether joining the target LAN is allowed, and information about whether serving as a relay for the target LAN is allowed; and
- an execution module 222, configured to perform a fourth related operation of a LAN service based on the second information.

Optionally, the terminal 220 further includes:
a transmitting module, configured to transmit first request information, where the first request information includes at least one of the following: request information for joining a target LAN and request information for serving as a relay for the target LAN.

Optionally, the LAN-related information of the target LAN includes at least one of the following:
- identification information of the target LAN;
- whether multicast is allowed;
- communication address information for multicast in the target LAN;
- communication address information of the terminal in the LAN;
- service scope information of the target LAN;
- information of a communications device within the target LAN;
- information of a DNN supporting the LAN; and
- information of a slice supporting the LAN.

Optionally, the LAN-relay-related information of the target LAN includes at least one of the following:
- identification information of the target LAN;
- whether multicast is allowed;
- communication address information for multicast in the target LAN;
- communication address information of the terminal in the target LAN;
- service scope information of the target LAN;
- information of a communications device within the target LAN;
- a communication address of the terminal serving as a LAN relay;
- service scope information of the LAN relay; and
- information of a communications device that the LAN relay is allowed to access.

Optionally, the fourth related operation of the LAN service includes at least one of the following:
- joining the target LAN;
- leaving the target LAN;
- performing one-to-one communication within the target LAN;
- performing one-to-many communication within the target LAN; and
- providing a relay service for a communications device within the target LAN.

Further, the providing a relay service for a communications device within the target LAN may include at least one of the following:
- adding, to a data packet of the relayed communications device, information of a VLAN corresponding to the target LAN;
- transmitting a request for joining the target LAN for the relayed communications device; and
- transmitting a request for leaving the target LAN for the relayed communications device.

The terminal in this embodiment of this disclosure corresponds to the terminal in the foregoing Embodiment 7. Some features related to the terminal in this embodiment are the same as the corresponding features in the method embodiment of Embodiment 7, and therefore, some features are not described again.

Figure 23:
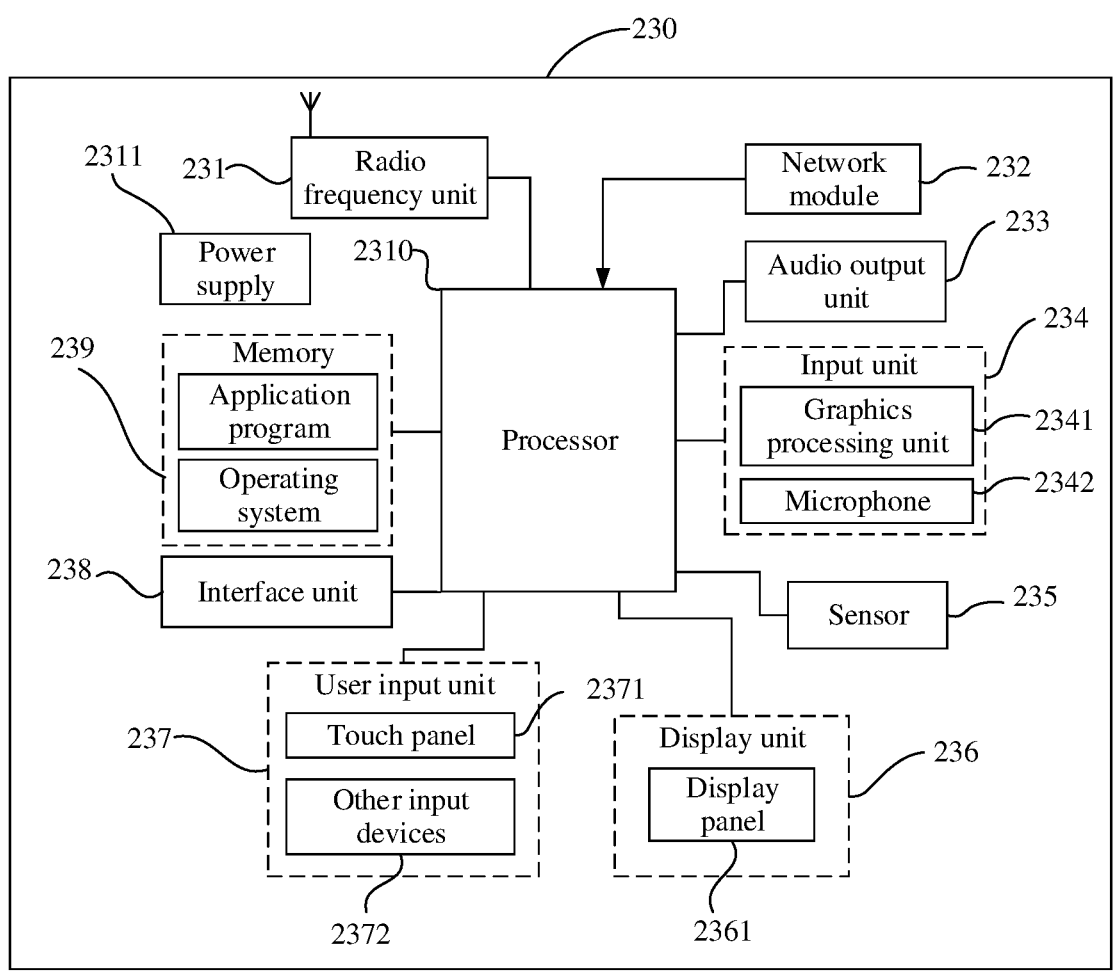
FIG. 23 is a schematic structural diagram of a terminal according to an embodiment of this disclosure.

Referring to FIG. 23, FIG. 23 is a schematic structural diagram of a terminal according to an embodiment of this disclosure. The terminal 230 includes but is not limited to components such as a radio frequency unit 231, a network module 232, an audio output unit 233, an input unit 234, a sensor 235, a display unit 236, a user input unit 237, an interface unit 238, a memory 239, a processor 2310, and a power supply 2311. A person skilled in the art may understand that the structure of the terminal shown in FIG. 23 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 231 is configured to transmit LAN-service-related information, where the LAN-service-related information includes at least one of the following: LAN service capability information of a terminal, location information of the terminal, LAN service subscription information, and LAN service request information;

or the radio frequency unit 231 is configured to transmit LAN service capability information of a network;

or the radio frequency unit 231 is configured to obtain first information, where the first information includes at least one of the following: LAN-service-related configuration information, LAN-service-relay-related configuration information, and LAN-related route selection policy information; and the processor 2310 is configured to perform a second related operation of a LAN service based on the first information;

or the radio frequency unit 231 is configured to transmit first request information, where the first request information includes at least one of the following: request information for joining a target LAN and request information for serving as a relay for the target LAN;

or the radio frequency unit 231 is configured to obtain second information, where the second information includes at least one of the following: LAN-relay-related information of a target LAN, LAN-related information of the target LAN, information about whether joining the target LAN is allowed, and information about whether serving as a relay for the target LAN is allowed; and the processor 2310 is configured to perform a fourth related operation of a LAN service based on the second information.

This embodiment of this disclosure can resolve a problem of how to support the LAN services, for example, controlling authorization of the LAN services in 3GPP, authorizing joining of a LAN group and establishment of a data channel, leaving the LAN group, and binding of a basic data channel, thereby improving communication efficiency.

It should be understood that in this embodiment of this disclosure, the radio frequency unit 231 may be configured to: receive and transmit signals in an information receiving/sending process or a call process; and specifically, after receiving downlink data from a base station, transmit the downlink information to the processor 2310 for processing, and in addition, transmit uplink data to the base station. Generally, the radio frequency unit 231 includes but is not limited to an antenna, at least one amplifier, a transceiver, a coupler, a low noise amplifier, a duplexer, and the like. In addition, the radio frequency unit 231 may further communicate with a network and another device through a wireless communications system.

The terminal provides a user with wireless broadband internet access through the network module 232, for example, helping the user to transmit and receive e-mails, browse web pages, and access streaming media.

The audio output unit 233 may convert audio data received by the radio frequency unit 231 or the network module 232 or stored in the memory 239 into an audio signal and output the audio signal as a sound. In addition, the audio output unit 233 may further provide audio output (for example, a call signal received sound or a message received sound) that is related to a specific function performed by the terminal 230. The audio output unit 233 includes a speaker, a buzzer, a telephone receiver, and the like.

The input unit 234 is configured to receive an audio or video signal. The input unit 234 may include a graphics processing unit (GPU) 2341 and a microphone 2342. The graphics processing unit 2341 processes image data of a static picture or a video that is obtained by an image capture apparatus (for example, a camera) in a video capture mode or an image capture mode. A processed image frame may be displayed on the display unit 236. An image frame processed by the graphics processing unit 2341 may be stored in the memory 239 (or another storage medium) or sent by the radio frequency unit 231 or the network module 232. The microphone 2342 can receive a sound and can process the sound into audio data. The processed audio data can be converted, for outputting, into a format that can be sent to a mobile communication base station through the radio frequency unit 231 in a telephone call mode.

The terminal 230 further includes at least one sensor 235, for example, an optical sensor, a motion sensor, and another sensor. Specifically, the optical sensor includes an ambient light sensor and a proximity sensor. The ambient light sensor may adjust brightness of a display panel 2361 based on intensity of ambient light. When the terminal 230 moves near an ear, the proximity sensor may disable the display panel 2361 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 235 may further include a fingerprint sensor, a pressure sensor, an iris sensor, a molecular sensor, a gyroscope, a barometer, a hygrometer, a thermometer, or an infrared sensor. Details are not described herein.

The display unit 236 is configured to display information input by the user or information provided for the user. The display unit 236 may include the display panel 2361. The display panel 2361 may be configured in a form of a liquid crystal display (LCD), an organic light-emitting diode (OLED), or the like.

The user input unit 237 may be configured to receive input digit or character information, and generate a key signal input related to a user setting and function control of the terminal. Specifically, the user input unit 237 includes a touch panel 2371 and other input devices 2372. The touch panel 2371, also referred to as a touchscreen, may capture a touch operation performed by a user on or near the touch panel (for example, an operation performed by the user on the touch panel 2371 or near the touch panel 2371 by using any appropriate object or accessory such as a finger or a stylus). The touch panel 2371 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and transmits the point coordinates to the processor 2310, and receives and executes a command sent by the processor 2310. In addition, the touch panel 2371 may be implemented in a plurality of forms, for example, as a resistive, capacitive, infrared, or surface acoustic wave touch panel. The user input unit 237 may further include other input devices 2372 in addition to the touch panel 2371. Specifically, the other input devices 2372 may include but are not limited to a physical keyboard, a function key (such as a volume control key or a power on/off key), a trackball, a mouse, a joystick, and the like. Details are not described herein.

Further, the touch panel 2371 may cover the display panel 2361. After detecting a touch operation on or near the touch panel 2371, the touch panel 2371 transmits the touch operation to the processor 2310 to determine a type of a touch event. Then the processor 2310 provides corresponding visual output on the display panel 2361 based on the type of the touch event. In FIG. 23, the touch panel 2371 and the display panel 2361 serve as two independent components to implement input and output functions of the terminal. However, in some embodiments, the touch panel 2371 and the display panel 2361 may be integrated to implement the input and output functions of the terminal. This is not specifically limited herein.

The interface unit 238 is an interface for connecting an external apparatus to the terminal 230. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 238 may be configured to: receive input (for example, data information and power) from the external apparatus, and transmit the received input to one or more elements in the terminal 230, or may be configured to transmit data between the terminal 230 and the external apparatus.

The memory 239 may be configured to store a software program and various data. The memory 239 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 239 may include a high-speed random access memory, or may include a non-volatile memory, for example, at least one magnetic disk storage device, a flash memory device, or other volatile solid-state storage devices.

The processor 2310 is a control center of the terminal, connects various parts of the entire terminal by using various interfaces and lines, and executes various functions and data processing of the terminal by running or executing a software program and/or a module stored in the memory 239 and invoking data stored in the memory 239, so as to perform overall monitoring on the terminal. The processor 2310 may include one or more processing units. Optionally, the processor 2310 may integrate an application processor and a modem processor. The application processor mainly processes an operating system, a user interface, an application program, and the like. The modem processor mainly processes wireless communication. It may be understood that the modem processor may alternatively not be integrated into the processor 2310.

The terminal 230 may further include the power supply 2311 (for example, a battery) supplying power to all components. Optionally, the power supply 2311 may be logically connected to the processor 2310 through a power management system. In this way, functions such as charge management, discharge management, and power consumption management are implemented by using the power management system.

In addition, the terminal 230 includes some functional modules that are not shown. Details are not described herein.

An embodiment of this disclosure further provides a first communications device, where the first communications device includes a processor and a memory. The processor is responsible for management of the bus architecture and general processing, and the memory may store data that is used by the processor to perform an operation. In this embodiment of this disclosure, the first communications device further includes a computer program stored in the memory and capable of running on the processor, where when the computer program is executed by the processor, the following steps are implemented: transmitting LAN-service-related information, where the LAN-service-related information includes at least one of the following: LAN service capability information of a terminal, location information of the terminal, LAN service subscription information, and LAN service request information.

Optionally, the LAN service request information includes at least one of the following: a request for serving as a LAN service relay and a request for accessing a LAN service.

Optionally, the LAN service capability information of the terminal includes at least one of the following: whether a LAN service is supported and whether serving as a LAN service relay is supported.

Optionally, if the LAN-service-related information includes the LAN service request information. When the computer program is executed by the processor, the following steps may be further implemented: transmitting the LAN service request information when a preset condition is satisfied; where the preset condition includes that LAN service capability information of a network is obtained.

An embodiment of this disclosure further provides a second communications device, where the second communications device includes a processor and a memory. The processor is responsible for management of the bus architecture and general processing, and the memory may store data that is used by the processor to perform an operation. In this embodiment of this disclosure, the second communications device further includes a computer program stored in the memory and capable of running on the processor. When the computer program is executed by the processor, the following steps are implemented: transmitting LAN service capability information of a network.

Optionally, the LAN service capability information of the network includes at least one of the following: indication information about whether a LAN service is supported, LAN-related information of a supported LAN, and LAN-related information of an unsupported LAN.

An embodiment of this disclosure further provides a third communications device, where the third communications device includes a processor and a memory. The processor is responsible for management of the bus architecture and general processing, and the memory may store data that is used by the processor to perform an operation. In this embodiment of this disclosure, the third communications device further includes a computer program stored in the memory and capable of running on the processor, where when the computer program is executed by the processor, the following steps are implemented: obtaining LAN-service-related information related to a terminal, where the LAN-service-related information includes at least one of the following: a LAN service capability of the terminal, location information of the terminal, LAN service subscription information, and LAN service request information; and performing a first related operation of a LAN service based on the LAN-service-related information.

Optionally, the first related operation of the LAN service includes at least one of the following:
  configuring LAN-service-related configuration information for the terminal;
  configuring LAN-service-relay-related configuration information for the terminal;
  configuring LAN-related route selection policy information for the terminal;
  transmitting the LAN-service-related configuration information;
  transmitting the LAN-service-relay-related configuration information;
  transmitting the LAN-related route selection policy information;
  transmitting LAN-related information of a LAN that the terminal is allowed to join; and
  transmitting LAN-related information of a LAN that the terminal is not allowed to join.

Further, the LAN-service-related configuration information includes at least one of the following:
  information about whether the LAN service is allowed;
  service scope information of the LAN service;
  LAN-related information of a LAN allowed to join;
  LAN-related information of a LAN not allowed to join;
  information of a DNN supporting the LAN; and
  information of a slice supporting the LAN service.

Further, the LAN-service-relay-related configuration information includes at least one of the following:
  information about whether serving as a LAN service relay is allowed;
  service scope information of the LAN service relay;
  LAN-relay-related information of a LAN that allows relaying;
  LAN-relay-related information of a LAN that does not allow relaying;
  LAN-related information of the LAN that allows relaying; and
  LAN-related information of the LAN that does not allow relaying.

Further, the LAN-related route selection policy information includes at least one of the following:
  whether an application is allowed to access the LAN service;
  LAN-related information of a LAN that the application is allowed to access;
  LAN-related information of a LAN that the application is not allowed to access;
  data network name DNN information of a LAN associated with the application; and
  slice information of the LAN associated with the application.

An embodiment of this disclosure further provides a terminal, where the terminal includes a processor and a memory. The processor is responsible for management of the bus architecture and general processing, and the memory may store data that is used by the processor to perform an operation. In this embodiment of this disclosure, the terminal further includes a computer program stored in the memory and capable of running on the processor. When the computer program is executed by the processor, the following steps are implemented:
  obtaining first information, where the first information includes at least one of the following: LAN-service-related configuration information, LAN-service-relay-related configuration information, and LAN-related route selection policy information; and
  performing a second related operation of a LAN service based on the first information.

Optionally, when the computer program is executed by the processor, the following steps may be further implemented: before the step of obtaining the first information, the following is further included: transmitting LAN-service-related information, where the LAN-service-related information includes at least one of the following: LAN service capability information of the terminal, location information of the terminal, and LAN service request information.

Optionally, the LAN-service-related configuration information includes at least one of the following:
  information about whether the LAN service is allowed;
  service scope information of the LAN service;
  LAN-related information of a LAN allowed to join;
  LAN-related information of a LAN not allowed to join;
  information of a DNN supporting the LAN service; and
  information of a slice supporting the LAN service.

Further, the service scope information of the LAN service includes at least one of the following:
  network identification information of a network supporting the LAN service;
  network type information of the network supporting the LAN service;
  information of a location area supporting the LAN service;
  information of a base station supporting the LAN service; and
  information of a cell supporting the LAN service.

The network type information includes at least one of the following: Type A, Type B, private communications network, virtual private communications network, and public communications network; and/or
  the network identification information includes at least one of the following: an identifier of a Type A network, an identifier of a Type B network, an identifier of a private communications network, an identifier of a virtual private communications network, and an identifier of a public communications network.

Further, the LAN-related information includes at least one of the following:
  LAN identification information;
  whether multicast is allowed;
  communication address information for multicast in a LAN;
  communication address information of the terminal in the LAN;
  service scope information of the LAN;
  information of a communications device within the LAN;
  information of a DNN supporting the LAN; and
  information of a slice supporting the LAN.

Further, the LAN identification information includes at least one of the following:
  a LAN identifier at an application layer;
  a LAN identifier in a communications network; and
  a LAN identifier at a transport layer.

Further, the service scope information of the LAN includes at least one of the following:
  a network identifier of a network supporting the LAN;
  network type information of the network supporting the LAN;
  information of a location area supporting the LAN;
  information of a base station supporting the LAN; and
  information of a cell supporting the LAN;

The network type information includes at least one of the following: Type A, Type B, private communications network, virtual private communications network, and a public communications network; and/or the network identification information includes at least one of the following: an identifier of a Type A network, an identifier of a Type B network, an identifier of a private communications network, an identifier of a virtual private communications network, and an identifier of a public communications network.

Further, the communication address information includes at least one of the following: a port, a media access control MAC address, an IP address, and VLAN information. In an implementation, the IP address is an IP address within an IP subnet corresponding to the LAN. Items that can be included in the communication address information of the terminal in the LAN may be consistent with the communication address information. Items that can be included in the communication address information for multicast may be consistent with the communication address information. For example, the IP address for LAN multicast is a multicast IP address, and a MAC address for LAN multicast is a multicast MAC address.

Further, the information of the communications device within the LAN includes communication address information of the communications device within the LAN.

Optionally, the LAN-service-relay-related configuration information includes at least one of the following:
  information about whether serving as a LAN service relay is allowed;
  service scope information of the LAN service relay;
  LAN-relay-related information of a LAN that allows relaying;
  LAN-relay-related information of a LAN that does not allow relaying;
  LAN-related information of the LAN that allows relaying; and
  LAN-related information of the LAN that does not allow relaying.

Further, the service scope information of the LAN service relay includes at least one of the following: network identification information, network type information, location area information, base station information, and information of a cell supporting the LAN service.

Further, the network type information includes at least one of the following: Type A, Type B, private communications network, virtual private communications network, and public communications network.

Further, the network identification information includes at least one of the following: an identifier of a Type A network, an identifier of a Type B network, an identifier of a private communications network, an identifier of a virtual private communications network, and an identifier of a public communications network.

Further, the LAN-relay-related information includes at least one of the following:
  LAN identification information;
  whether multicast is allowed;
  communication address information for multicast in a LAN;
  communication address information of the terminal in the LAN;
  service scope information of the LAN;
  information of a communications device within the LAN;
  a communication address of the terminal serving as a LAN relay;
  service scope information of the LAN relay; and
  information of a communications device that the LAN relay is allowed to access.

Optionally, the LAN-related route selection policy information includes at least one of the following:
  whether an application is allowed to access the LAN service;
  LAN-related information of a LAN that the application is allowed to access;
  LAN-related information of a LAN that the application is not allowed to access;
  DNN information of a LAN associated with the application; and
  slice information of the LAN associated with the application.

Optionally, the second related operation of the LAN service includes at least one of the following:
  joining a LAN;
  leaving the LAN;
  performing one-to-one communication within the LAN;
  performing one-to-many communication within the LAN; and
  providing a relay service for a communications device within the LAN.

Further, the providing a relay service for a communications device within the LAN may include at least one of the following:
  adding, to a data packet of the relayed communications device, information of a VLAN corresponding to the LAN;
  transmitting a request for joining the LAN for the relayed communications device; and
  transmitting a request for leaving the LAN for the relayed communications device.

An embodiment of this disclosure further provides a terminal, where the terminal includes a processor and a memory. The processor is responsible for management of the bus architecture and general processing, and the memory may store data that is used by the processor to perform an operation. In this embodiment of this disclosure, the terminal further includes a computer program stored in the memory and capable of running on the processor, where when the computer program is executed by the processor, the following steps are implemented: transmitting first request information, where the first request information includes at least one of the following: request information for joining a target LAN and request information for serving as a relay for the target LAN.

An embodiment of this disclosure further provides a network-side device, where the network-side device includes a processor and a memory. The processor is responsible for management of the bus architecture and general processing, and the memory may store data that is used by the processor to perform an operation. In this embodiment of this disclosure, the network-side device further includes a computer program stored in the memory and capable of running on the processor, where when the computer program is executed by the processor, the following steps are implemented: determining whether a preset condition is satisfied; and if the preset condition is satisfied, performing a third related operation of a LAN service.

Optionally, the preset condition includes at least one of the following: that first request information is obtained, and that LAN-related information of a target LAN is generated or updated.

The first request information includes at least one of the following: request information for joining a target LAN by a terminal and request information for serving as a relay for the target LAN.

Optionally, the third related operation of the LAN service includes at least one of the following:
  verifying whether the terminal is allowed to join the target LAN;
  transmitting information about whether the terminal is allowed to join the target LAN;
  verifying whether the terminal is allowed to serve as a relay for the target LAN; and
  transmitting information about whether the terminal is allowed to serve as the relay for the target LAN.

Further, when the terminal is allowed to join the target LAN, the third related operation of the LAN service includes at least one of the following:
  configuring LAN-related information of the target LAN for the terminal;
  transmitting the LAN-related information of the target LAN; and
  transmitting LAN-related information of the target LAN that the terminal is allowed to join.

When the terminal is not allowed to join the target LAN, the third related operation of the LAN service includes: transmitting, to a second target end, the LAN-related information of the target LAN that the terminal is not allowed to join.

Further, when the terminal is allowed to serve as the relay for the target LAN, the third related operation of the LAN service includes at least one of the following:
  configuring relay-related information of the target LAN for the terminal;
  configuring LAN-related information of the target LAN for the terminal;
  transmitting relay-related information of the target LAN; and
  transmitting LAN-related information of the target LAN that the terminal is allowed to join.

When the terminal is not allowed to serve as the relay for the target LAN, the third related operation of the LAN service includes: transmitting the LAN-related information of the target LAN in which the terminal is not allowed to serve as a relay.

Further, the information about whether the terminal is allowed to join the target LAN is information about whether the terminal is allowed to establish a related data channel of the target LAN or whether to establish a related data channel of the target LAN for the terminal.

An embodiment of this disclosure further provides a terminal, where the terminal includes a processor and a memory. The processor is responsible for management of the bus architecture and general processing, and the memory may store data that is used by the processor to perform an operation. In this embodiment of this disclosure, the terminal further includes a computer program stored in the memory and capable of running on the processor. When the computer program is executed by the processor, the following steps are implemented:
  obtaining second information, where the second information includes at least one of the following: LAN-relay-related information of a target LAN, LAN-related information of the target LAN, information about whether joining the target LAN is allowed, and information about whether serving as a relay for the target LAN is allowed; and
  performing a fourth related operation of the LAN service based on the second information.

Optionally, when the computer program is executed by the processor, the following steps are implemented: before the step of obtaining the second information, the following is further included: transmitting first request information, where the first request information includes at least one of the following: request information for joining a target LAN and request information for serving as a relay for the target LAN.

Optionally, the LAN-related information of the target LAN includes at least one of the following:
  identification information of the target LAN;
  whether multicast is allowed;
  communication address information for multicast in the target LAN;
  communication address information of the terminal in the LAN;
  service scope information of the target LAN;
  information of a communications device within the target LAN;
  information of a DNN supporting the LAN; and
  information of a slice supporting the LAN.

Optionally, the LAN-relay-related information of the target LAN includes at least one of the following:
  identification information of the target LAN;
  whether multicast is allowed;
  communication address information for multicast in the target LAN;
  communication address information of the terminal in the target LAN;
  service scope information of the target LAN;
  information of a communications device within the target LAN;
  a communication address of the terminal serving as a LAN relay;
  service scope information of the LAN relay; and
  information of a communications device that the LAN relay is allowed to access.

Optionally, the fourth related operation of the LAN service includes at least one of the following:
  joining the target LAN;
  leaving the target LAN;
  performing one-to-one communication within the target LAN;
  performing one-to-many communication within the target LAN; and
  providing a relay service for a LAN device within the target LAN.

Further, the providing a relay service for a communications device within the target LAN may include at least one of the following:
  adding, to a data packet of the relayed communications device, information of a VLAN corresponding to the target LAN;
  transmitting a request for joining the target LAN for the relayed communications device; and
  transmitting a request for leaving the target LAN for the relayed communications device.

An embodiment of this disclosure further provides a computer-readable storage medium. The computer-readable storage medium stores a computer program, and when the computer program is executed by a processor, the processes of the embodiment of the method for controlling a LAN service are implemented, with the same technical effect achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementation manners, a person skilled in the art may clearly understand that the foregoing embodiments may be implemented by using software in combination with a necessary common hardware platform, and certainly may alternatively be implemented by using hardware. However, in most cases, the former is a preferred implementation manner. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for controlling a local area network (LAN) service, performed by a third communications device and comprising:
obtaining LAN-service-related information related to a terminal, wherein the LAN-service-related information comprises at least one of the following: a LAN service capability of the terminal, location information of the terminal, LAN service subscription information, and LAN service request information; and
performing a first related operation of a LAN service based on the LAN-service-related information;
wherein the LAN service comprises private communication services provided for a group of terminals on a communications network;
the first related operation of the LAN service comprises:
configuring LAN-related route selection policy information for the terminal; and
the LAN-related route selection policy information comprises at least one of:
data network name (DNN) information of a LAN associated with an application; or
slice information of the LAN associated with the application.

2. The method for controlling a LAN service according to claim 1, wherein the first related operation of the LAN service further comprises at least one of the following:
configuring LAN-service-related configuration information for the terminal;
configuring LAN-service-relay-related configuration information for the terminal;
transmitting the LAN-service-related configuration information;
transmitting the LAN-service-relay-related configuration information;
transmitting the LAN-related route selection policy information;
transmitting LAN-related information of a LAN that the terminal is allowed to join; or
transmitting LAN-related information of a LAN that the terminal is not allowed to join.

3. The method for controlling a LAN service according to claim 2, wherein the LAN-service-related configuration information comprises at least one of the following:
information about whether the LAN service is allowed;
service scope information of the LAN service;
LAN-related information of a LAN allowed to join;
LAN-related information of a LAN not allowed to join;
information of a DNN supporting the LAN service; or
information of a slice supporting the LAN service.

4. The method for controlling a LAN service according to claim 2, wherein the LAN-service-relay-related configuration information comprises at least one of the following:
information about whether serving as a LAN service relay is allowed;
service scope information of the LAN service relay;
LAN-relay-related information of a LAN that allows relaying;
LAN-relay-related information of a LAN that does not allow relaying;
LAN-related information of the LAN that allows relaying; or
LAN-related information of the LAN that does not allow relaying.

5. The method for controlling a LAN service according to claim 2, wherein the LAN-related route selection policy information further comprises at least one of the following:
whether the application is allowed to access the LAN service;
LAN-related information of a LAN that the application is allowed to access; or
LAN-related information of a LAN that the application is not allowed to access.

6. A communications device, comprising a processor, a memory, and a computer program stored in the memory and capable of running on the processor, wherein when the computer program is executed by the processor, the processor is configured to perform the steps of:
obtaining LAN-service-related information related to a terminal, wherein the LAN-service-related information comprises at least one of the following: a LAN service capability of the terminal, location information of the terminal, LAN service subscription information, and LAN service request information; and
performing a first related operation of a LAN service based on the LAN-service-related information;
wherein the LAN service comprises private communication services provided for a group of terminals on a communications network;
the first related operation of the LAN service comprises:
configuring LAN-related route selection policy information for the terminal; and
the LAN-related route selection policy information comprises at least one of:
data network name (DNN) information of a LAN associated with an application; or
slice information of the LAN associated with the application.

7. The communications device according to claim 6, wherein the first related operation of the LAN service further comprises at least one of the following:
- configuring LAN-service-related configuration information for the terminal;
- configuring LAN-service-relay-related configuration information for the terminal;
- transmitting the LAN-service-related configuration information;
- transmitting the LAN-service-relay-related configuration information;
- transmitting the LAN-related route selection policy information;
- transmitting LAN-related information of a LAN that the terminal is allowed to join; or
- transmitting LAN-related information of a LAN that the terminal is not allowed to join.

8. The communications device according to claim 7, wherein the LAN-service-related configuration information comprises at least one of the following:
- information about whether the LAN service is allowed;
- service scope information of the LAN service;
- LAN-related information of a LAN allowed to join;
- LAN-related information of a LAN not allowed to join;
- information of a DNN supporting the LAN service; or
- information of a slice supporting the LAN service.

9. The communications device according to claim 7, wherein the LAN-service-relay-related configuration information comprises at least one of the following:
- information about whether serving as a LAN service relay is allowed;
- service scope information of the LAN service relay;
- LAN-relay-related information of a LAN that allows relaying;
- LAN-relay-related information of a LAN that does not allow relaying;
- LAN-related information of the LAN that allows relaying; or
- LAN-related information of the LAN that does not allow relaying.

10. The communications device according to claim 7, wherein the LAN-related route selection policy information further comprises at least one of the following:
- whether the application is allowed to access the LAN service;
- LAN-related information of a LAN that the application is allowed to access; or
- LAN-related information of a LAN that the application is not allowed to access.

11. A non-transitory computer readable storage medium, wherein the computer readable storage medium stores a computer program, and the computer program, when executed by a processor, cause the processor to perform steps of:
- obtaining LAN-service-related information related to a terminal, wherein the LAN-service-related information comprises at least one of the following: a LAN service capability of the terminal, location information of the terminal, LAN service subscription information, and LAN service request information; and
- performing a first related operation of a LAN service based on the LAN-service-related information;
- wherein the LAN service comprises private communication services provided for a group of terminals on a communications network;
- the first related operation of the LAN service comprises: configuring LAN-related route selection policy information for the terminal; and
- the LAN-related route selection policy information comprises at least one of:
- data network name (DNN) information of a LAN associated with an application; or
- slice information of the LAN associated with the application.

12. The non-transitory computer readable storage medium, according to claim 11, wherein the first related operation of the LAN service further comprises at least one of the following:
- configuring LAN-service-related configuration information for the terminal;
- configuring LAN-service-relay-related configuration information for the terminal;
- transmitting the LAN-service-related configuration information;
- transmitting the LAN-service-relay-related configuration information;
- transmitting the LAN-related route selection policy information;
- transmitting LAN-related information of a LAN that the terminal is allowed to join; or
- transmitting LAN-related information of a LAN that the terminal is not allowed to join.

13. The non-transitory computer readable storage medium, according to claim 12, wherein the LAN-service-related configuration information comprises at least one of the following:
- information about whether the LAN service is allowed;
- service scope information of the LAN service;
- LAN-related information of a LAN allowed to join;
- LAN-related information of a LAN not allowed to join;
- information of a DNN supporting the LAN service; or
- information of a slice supporting the LAN service.

14. The non-transitory computer readable storage medium, according to claim 12, wherein the LAN-service-relay-related configuration information comprises at least one of the following:
- information about whether serving as a LAN service relay is allowed;
- service scope information of the LAN service relay;
- LAN-relay-related information of a LAN that allows relaying;
- LAN-relay-related information of a LAN that does not allow relaying;
- LAN-related information of the LAN that allows relaying; or
- LAN-related information of the LAN that does not allow relaying.

15. The non-transitory computer readable storage medium, according to claim 12, wherein the LAN-related route selection policy information further comprises at least one of the following:
- whether the application is allowed to access the LAN service;
- LAN-related information of a LAN that the application is allowed to access; or
- LAN-related information of a LAN that the application is not allowed to access.

* * * * *